United States Patent
Moore et al.

(10) Patent No.: US 6,814,169 B2
(45) Date of Patent: Nov. 9, 2004

(54) INTERCHANGEABLE ACCESSORIES FOR A REMOTE CONTROLLED INSPECTION VEHICLE

(75) Inventors: Michael C. Moore, Hibbs, PA (US); Charles C. Moore, Hibbs, PA (US); Mark W. Fischer, Pittsburgh, PA (US); James A. Bauer, Gibsonia, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/456,039

(22) Filed: Jun. 6, 2003

(65) Prior Publication Data

US 2004/0020002 A1 Feb. 5, 2004

Related U.S. Application Data

(63) Continuation-in-part of application No. 09/995,182, filed on Nov. 27, 2001, now Pat. No. 6,672,413.

(51) Int. Cl.⁷ .............................................. B62D 55/065
(52) U.S. Cl. ..................................... 180/9.21; 180/9.48
(58) Field of Search ........................... 180/9, 9.1, 9.21, 180/9.4, 9.46, 9.48, 901; 901/1, 30, 40, 41; 280/5.22, 5.4, 5.28; 305/6

(56) References Cited

U.S. PATENT DOCUMENTS

| | | | |
|---|---|---|---|
| 4,341,276 A | 7/1982 | Furuichi | |
| 4,457,388 A | 7/1984 | Koehler et al. | |
| 4,515,747 A | 5/1985 | Creek et al. | |
| 4,519,465 A | 5/1985 | Triplett | |
| 4,661,309 A | 4/1987 | Hayes | |
| 4,664,212 A | 5/1987 | Nagatsuka et al. | |
| 4,702,878 A | 10/1987 | Klug et al. | |
| 4,709,773 A | 12/1987 | Clement et al. | |
| 4,792,276 A | 12/1988 | Krawiec et al. | |
| 4,804,038 A | 2/1989 | Klahn et al. | |
| 4,828,059 A | 5/1989 | Naito et al. | |
| 4,897,014 A * | 1/1990 | Tietze | 414/729 |
| 4,984,627 A | 1/1991 | LeBourgeois | |
| 5,022,812 A | 6/1991 | Coughlan et al. | |
| 5,125,467 A | 6/1992 | Mancheron | |
| 5,139,732 A | 8/1992 | Godin | |
| 5,148,882 A | 9/1992 | Carra et al. | |
| 5,174,405 A | 12/1992 | Carra et al. | |
| 5,186,270 A | 2/1993 | West | |
| 5,248,008 A | 9/1993 | Clar | |
| 5,265,667 A | 11/1993 | Lester, II et al. | |
| 5,286,154 A | 2/1994 | Jens et al. | |
| 5,293,949 A | 3/1994 | Zimmermann | |
| 5,348,359 A | 9/1994 | Boozer | |
| 5,435,405 A | 7/1995 | Schempf et al. | |
| 5,465,525 A | 11/1995 | Mifune et al. | |
| 5,517,416 A | 5/1996 | Torii et al. | |
| 5,570,992 A * | 11/1996 | Lemelson | 414/744.3 |
| 5,575,328 A | 11/1996 | Hyp | |
| 5,647,721 A | 7/1997 | Rohrbaugh | |
| 5,894,901 A | 4/1999 | Awamura et al. | |
| 6,285,919 B1 | 9/2001 | Randolph et al. | |
| 6,374,933 B1 | 4/2002 | Ruppert, Jr. et al. | |
| 6,394,204 B1 | 5/2002 | Haringer | |
| 6,487,922 B1 | 12/2002 | Bauer et al. | |
| 6,672,413 B2 * | 1/2004 | Moore et al. | 180/9.21 |

* cited by examiner

*Primary Examiner*—Lesley D. Morris
*Assistant Examiner*—Matthew Luby

(57) ABSTRACT

A remote-controlled vehicle and method for performing a plurality of tasks in a location generally inaccessible to humans are provided. The vehicle may include a propulsion frame, and a platform attached to the frame or integral therewith for supporting an interchangeable accessory selected from a set of distinct interchangeable accessories. Each distinct interchangeable accessory may be configured to perform a distinct operational task. The platform includes at least one mechanical power takeoff, and each accessory includes at least one mechanical power receptor configured to interface with the mechanical power takeoff for coupling mechanical energy to the accessory. The platform constitutes a universal platform for the set of distinct interchangeable accessories.

28 Claims, 20 Drawing Sheets

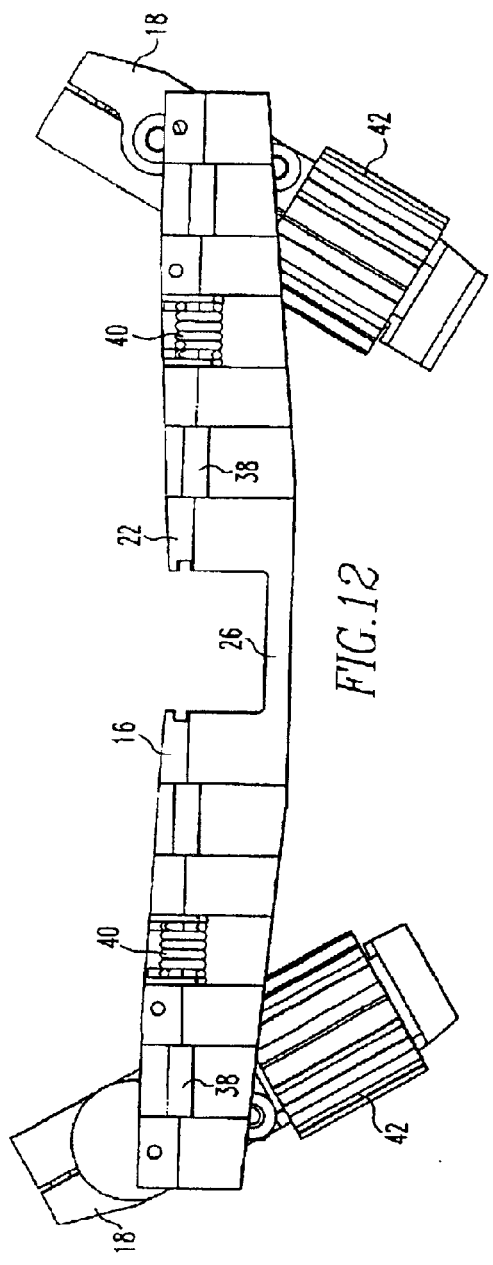
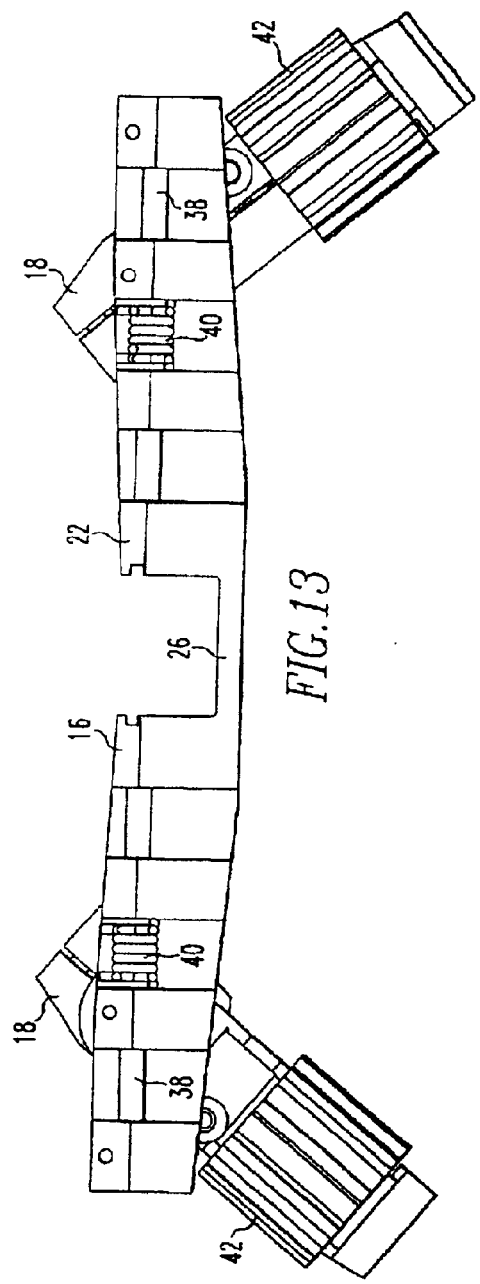

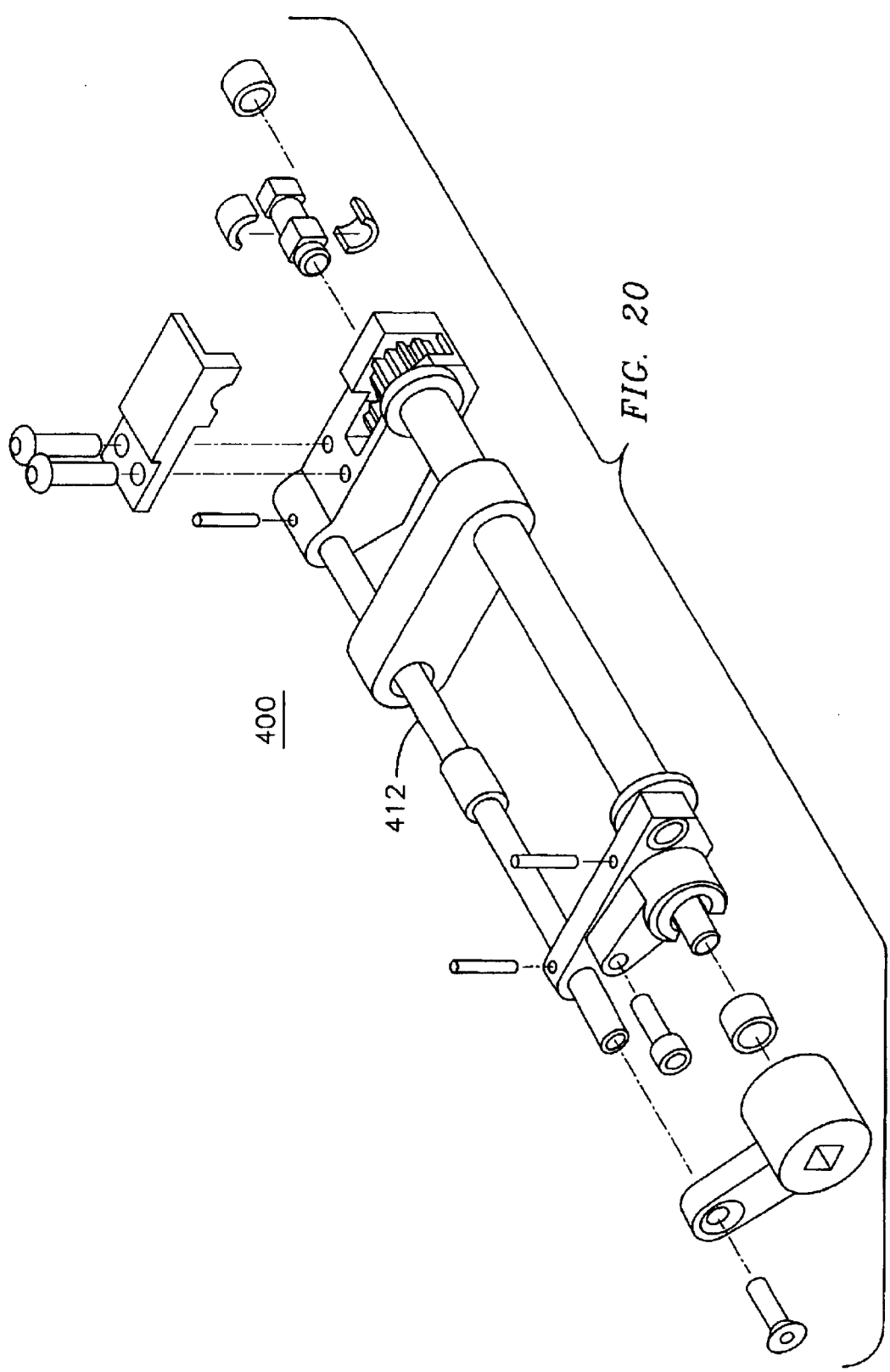

INTERCHANGEABLE ACCESSORIES FOR A REMOTE CONTROLLED INSPECTION VEHICLE

CROSS REFERENCE TO RELATED APPLICATION

The present application is a Continuation-In-Part of U.S. application Ser. No. 09/995,182, filed Nov. 27, 2001.

BACKGROUND OF THE INVENTION

1. Field of the Invention

The present invention generally relates to remote controlled, unmanned inspection vehicles. The present invention further relates to inspection vehicles capable of entry into highly constrained spaces, and traversing nonhorizontal and/or nonflat ferromagnetic surfaces through magnetic adhesion to such surfaces. More specifically, the present invention relates to interchangeable accessories that make use of a universal platform to perform a plurality of different operational tasks.

2. Description of the Related Art

It is frequently necessary to perform inspections of machinery, storage tanks, etc., where highly constrained entry points and/or environmental hazards make direct human inspection either impossible or inadvisable. Examples include electrical generators and other machinery having highly constrained travel spaces between various moving components therein, storage tanks wherein chemical hazards are present, such as underground gasoline tanks, and pools containing nuclear reactor spent fuel wherein radiation hazards are present. Frequently, access to various regions that must be inspected requires traversing nonhorizontal surfaces, such as angled components and/or walls, and/or nonflat surfaces, such as the exterior or interior of pipes.

U.S. patent application Ser. No. 09/995,182 (Publication No. 2002/0104693), titled "Remote Controlled Inspection Vehicle Utilizing Magnetic Adhesion To Traverse Nonhorizontal, Nonflat, Ferromagnetic Surfaces," assigned in common to the same assignee of the present invention and herein incorporated by reference, describes a remote controlled inspection vehicle capable of fitting into extremely small spaces. One example of a small space for performing inspections in areas inaccessible to human inspectors due to small size and/or hazardous conditions may be the air gap between the rotor and stator of an electrical generator. The inspection vehicle may include propulsion units designed for traversing concave and convex surfaces, for example, the interior and exterior of pipes.

The inspection vehicle may also include effectors for performing various tasks within such constrained spaces. It is desirable to improve the operational and integrational capability of such effectors to be able to economically and effectively perform a plurality of operational tasks within the hard-to-reach areas that may be accessed by the vehicle.

BRIEF SUMMARY OF THE INVENTION

The inventors of the present invention have innovatively recognized a solution that may allow equipping a remote controlled inspection vehicle with easily interchangeable accessories that make use of a universal platform that may be connected to the vehicle to perform a plurality of different tasks. By way of example, such tasks may allow identifying, capturing, containing and retrieving FOD (foreign object debris, e.g., hardware (metallic and non-metallic), paint chips, dust, dirt, etc.,), which may be found within the hard-to-reach areas that may be accessed by the vehicle. This solution further allows remotely monitoring the performance of such tasks using cameras arranged to view performance of the operational tasks as well as cameras arranged for assisting an operator to guide the vehicle. In one exemplary embodiment, the solution may provide in combination with any of the interchangeable accessories, a vacuum cleaner having a footprint sufficiently small to fit within a compartment in the remote controlled vehicle. The vacuum developed by the vacuum cleaner may be created in response to a pressurized source of air, thereby avoiding both the need of an external vacuum source as well as lengthy conduits for carrying such vacuum to the interior of a location or equipment undergoing inspection.

Generally, the present invention fulfills the foregoing needs by providing in one aspect thereof, a remote-controlled vehicle for performing a plurality of tasks in a location generally inaccessible to humans. The vehicle may comprise a propulsion frame, and a platform attached to the frame for supporting an interchangeable accessory selected from a set of distinct interchangeable accessories. Each distinct interchangeable accessory may be configured to perform a distinct operational task. The platform comprises at least one mechanical power takeoff, and each accessory comprises at least one mechanical power receptor configured to interface with the mechanical power takeoff for coupling mechanical energy to the accessory. The platform constitutes a universal platform for the set of distinct interchangeable accessories.

In another aspect thereof, the present invention further fulfills the foregoing needs by providing a platform for performing a plurality of tasks in a location generally inaccessible to humans. The platform comprises an interchangeable accessory selected from a set of distinct interchangeable accessories. Each distinct interchangeable accessory may be configured to perform a distinct operational task. The platform comprises at least one mechanical power takeoff, and each accessory may comprise at least one mechanical power receptor configured to interface with the at least one mechanical power takeoff for coupling mechanical energy to the accessory. The platform constitutes a universal platform for the set of distinct interchangeable accessories.

BRIEF DESCRIPTION OF THE DRAWINGS

FIG. 12 is a front view of a complete frame unit for an inspection vehicle, illustrating the drive modules rotated significantly, thereby facing the tracks further outward.

FIG. 13 is a front view of a remote controlled inspection vehicle, showing the maximum degree of rotation permitted for the drive modules.

FIG. 20 is a partially exploded view of an exemplary interchangeable accessory comprising a vacuum hose positioner.

Like reference numbers denote like elements throughout the drawings.

DETAILED DESCRIPTION

Figure 1:
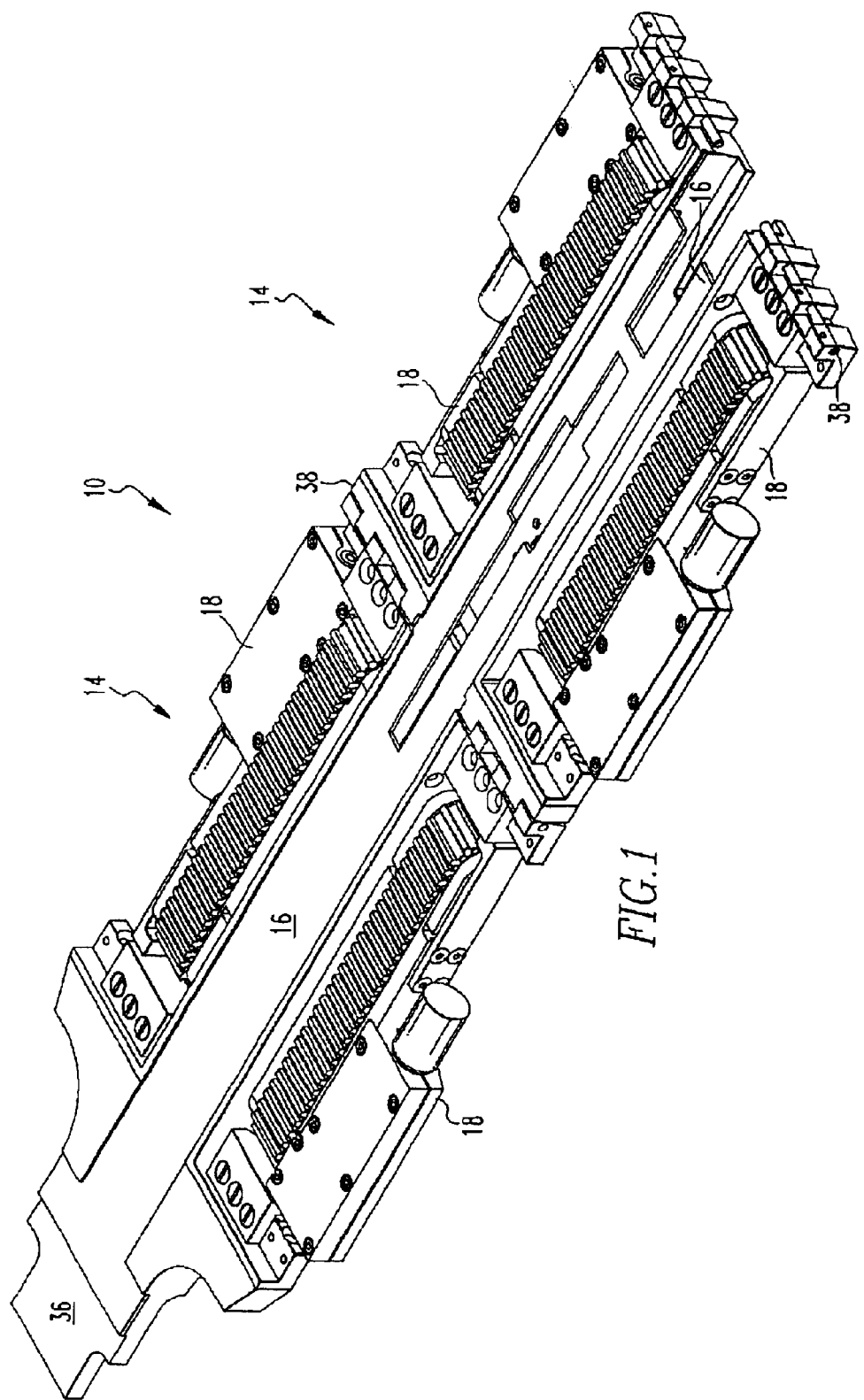
FIG. 1 is a top isometric view of an exemplary remote controlled inspection vehicle, illustrating two frame modules and a tail module.
Figure 2:
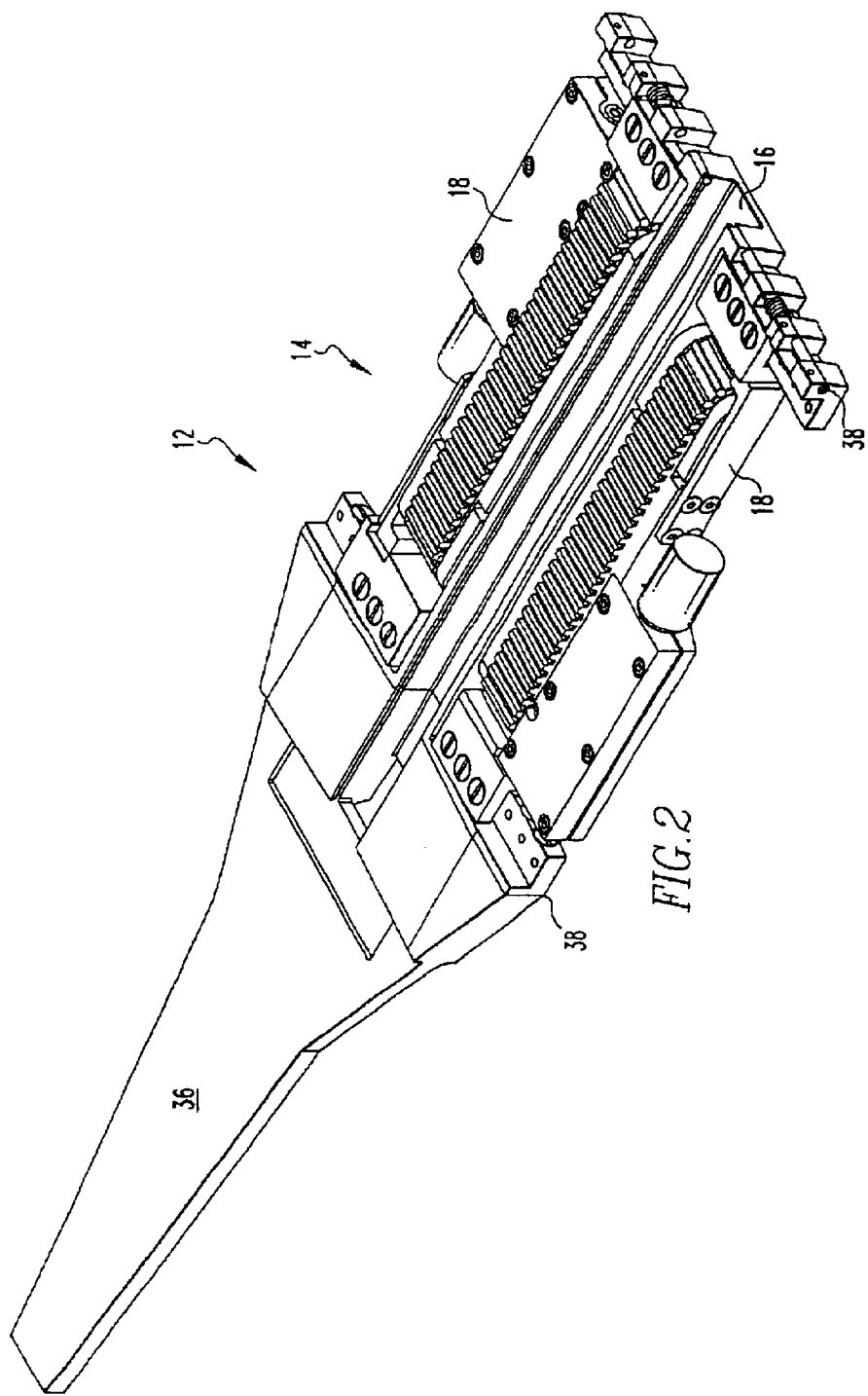
FIG. 2 is a top isometric view of a remote controlled inspection vehicle, illustrating a single frame module and a tail module.

Exemplary embodiments of the present invention comprise various configurations of a remote controlled inspection vehicle capable of traversing nonhorizontal, ferromagnetic surfaces, and non-flat surfaces. Referring to FIGS. 1 and 2, a first vehicle embodiment 10 and second vehicle embodiment 12 are illustrated. The vehicle embodiments 10,12 differ in the number of frame/drive module assemblies 14 present, with the vehicle 10 having two frame/drive module assemblies 14, and the vehicle 12 having a single frame/drive module assembly 14. Each frame/drive module assembly 14 includes a frame 16, having a drive module 18 on either side. Additionally, the vehicle embodiments 10,12 are illustrated with different tail sections 36 (described below), with the tail section 36 being user-selectable based on the desired use of the vehicle 10,12.

Figure 3:
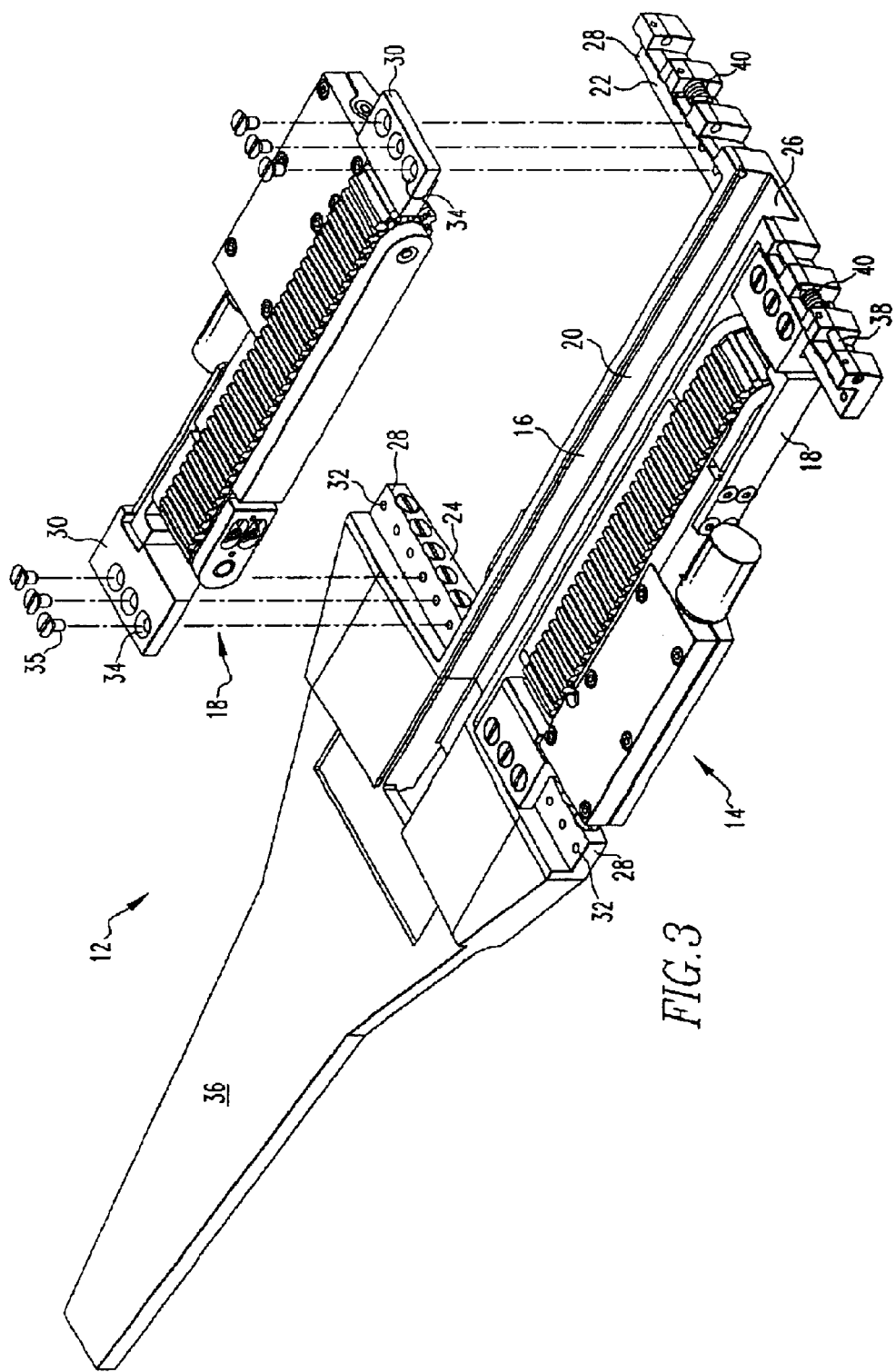
FIG. 3 is a partially exploded, isometric view of a remote controlled inspection vehicle, illustrating a single frame module and a tail module.

Referring to FIG. 3, the frame 16 preferably includes a central longitudinal beam 20, with a front transverse beam 22 and rear transverse beam 24 extending horizontally from each end portion of longitudinal beam 20. The longitudinal beam 20 may be hollow, thereby defining a channel 26, dimensioned and configured to serve as a conduit for power supply, control, and signal transmitter wiring. The front transverse beam 22 and rear transverse beam 24 both include means for securing a drive module 18 on either side of the longitudinal beam 20, and to selectively position the drive modules 18 at a desired distance from each other, and from the longitudinal beam 20. The illustrated example includes a ledge 28 on both the front transverse beam 22 and rear transverse beam 24, dimensioned and configured to support a corresponding end brace 30 on each end of the drive module 18. The ledge 28 defines a plurality of apertures 32, and the end bracket 30 defines at least one aperture 34, with the apertures 34 being dimensioned and configured to align with the apertures 32 when the drive module 18 is secured to the frame 16. In the illustrated example, three apertures 34 and six apertures 32 are present. Therefore, by aligning the three apertures 34 with any three adjacent apertures 32, and fastening the end bracket 30 and ledge 28 together utilizing a fastener dimensioned and configured to mate with the apertures 32, 34, for example, the screw 35, the drive module 18 may be located at any one of four possible distances from the longitudinal beam 20. Depending on the desired number of possible distances from the longitudinal beam 20 to the drive module 18, the number of apertures 32, 34 may, of course, be varied. The front transverse beam 22 and rear transverse beam 24 also include means for pivotally securing a pair of frames 16 together, for securing a tail section 36 to a rear transverse beam 24, or for securing an effector (described below). In the present example, the hinged attachment 38 provides these connections. The hinged attachment 38 may include means for biasing the secured components towards a coplanar orientation with respect to each other, for example, the springs 40.

Figure 4:
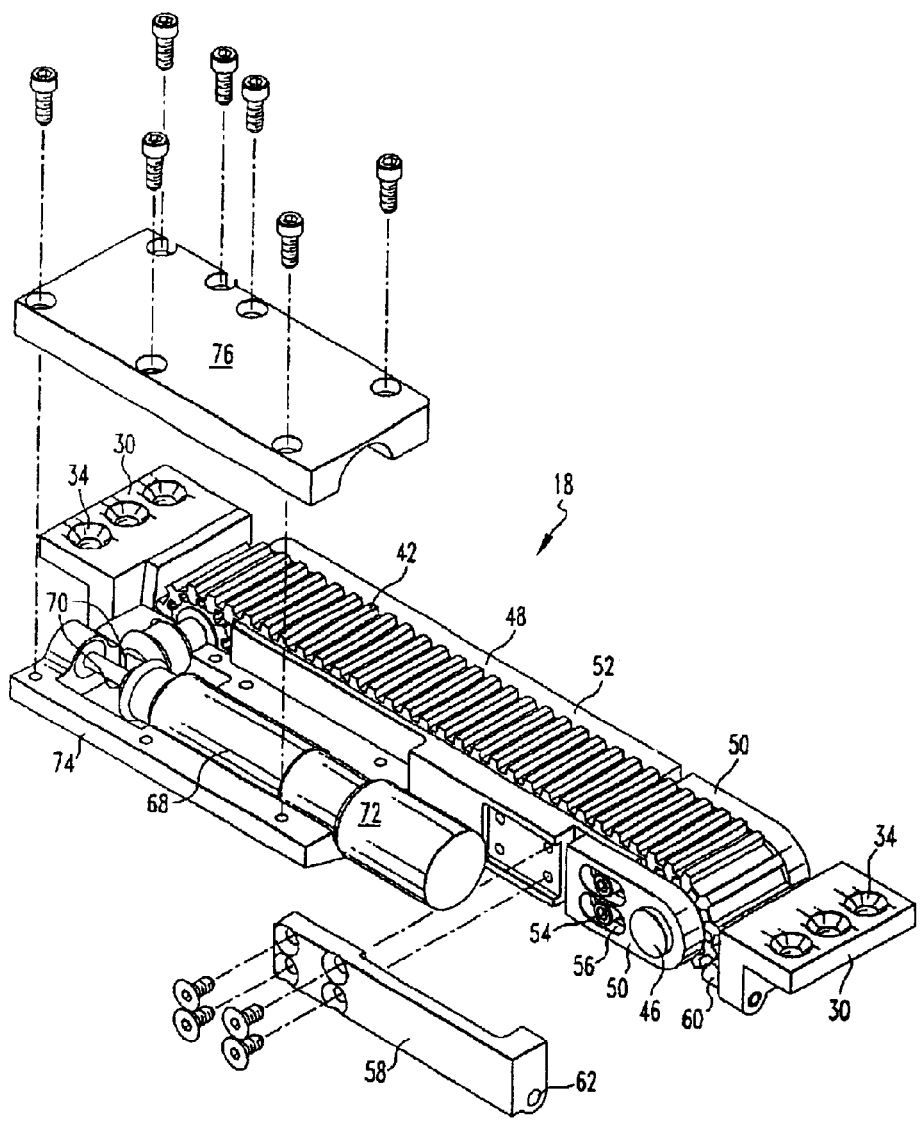
FIG. 4 is a partially exploded view of a drive module of a remote controlled inspection vehicle.
Figure 5:
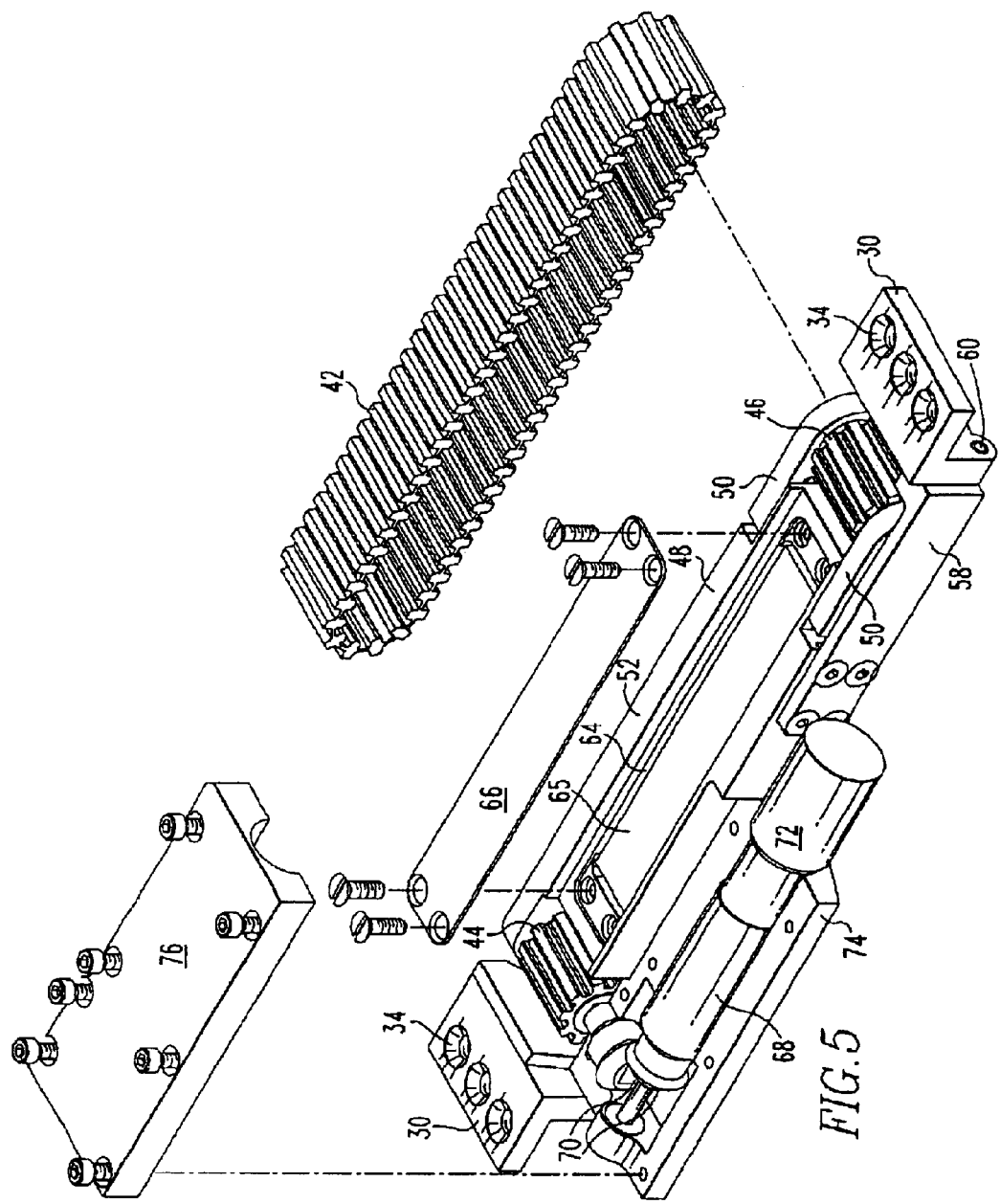
FIG. 5 is a partially exploded view of a drive module of a remote controlled inspection vehicle.
Figure 6:
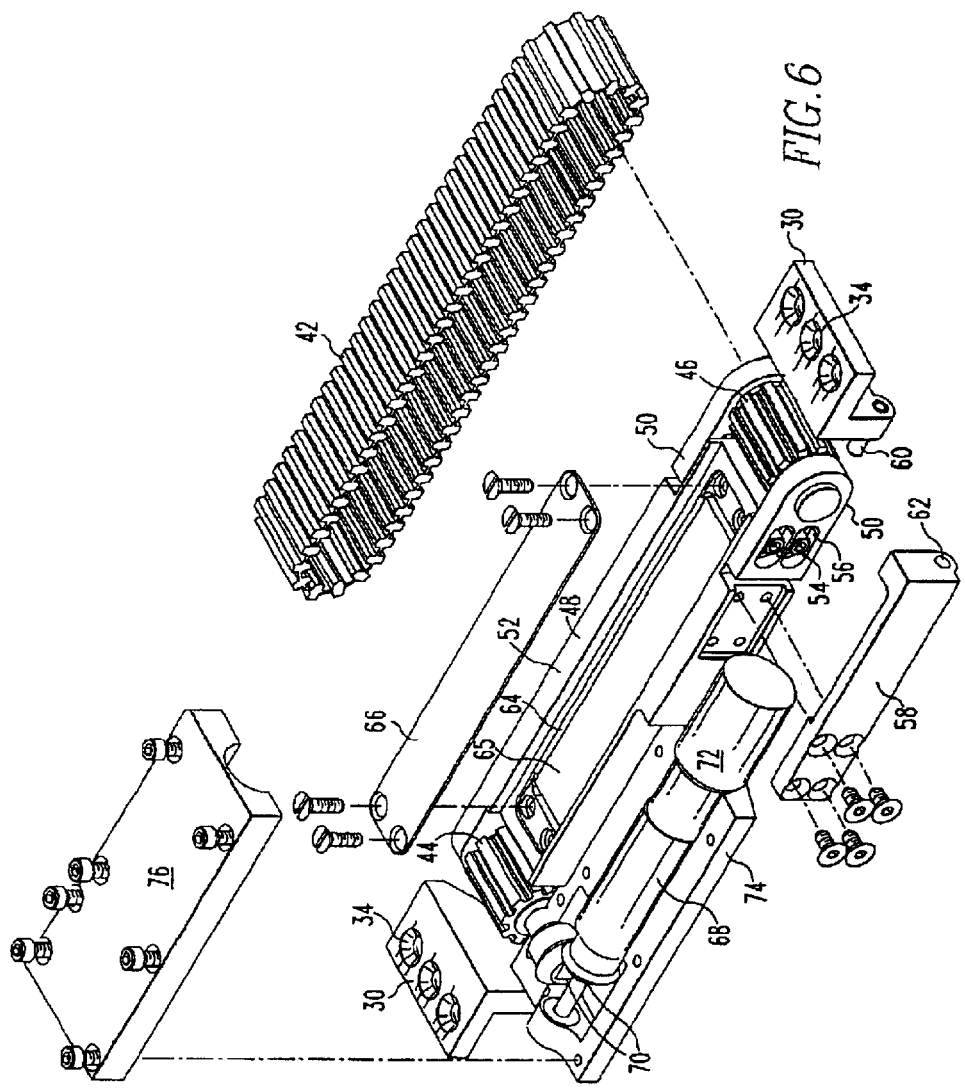
FIG. 6 is a partially exploded view of a drive module of a remote controlled inspection vehicle.

A drive module 18 is illustrated in FIGS. 4–6. The drive module 18 includes a continuous track 42, extending between a drive wheel 44 and an idler wheel 46. The drive wheel 44 and idler wheel 46 are both mounted on the drive module frame assembly 48. The frame 48 may include a slideably mounted idler support 50, slideably secured to the frame 52 by the set screws 54, passing through the slots 56 defined within the idler support 50. The frame assembly 48 also includes an end bracket 30 pivotally secured at each end of the drive module 18, dimensioned and configured to permit the track 42 to pivot around a longitudinal axis. In the illustrated example, the end bracket 30 adjacent to the drive wheel 44 is pivotally secured to the frame 52, and the end bracket adjacent to the idler wheel 46 is pivotally secured to the bracket support 58, which is in turn rigidly and removably secured to the frame 52. The bracket support 58 in the illustrated example extends on top of the setscrews 54, and is therefore removable to permit access to these setscrews 54. The means for permitting the track 42 to pivot in the illustrated example are the pin 60 in the end bracket 30, dimensioned and configured to be received within the hole 62 within the frame 52 and the bracket support 58. The pin 60 and hole 62 may, of course, be reversed. The frame 52 also defines a magnet-receiving region 64 containing magnet 65, located within the track 42, and secured by the cover 66. The magnet 65 will in some preferred embodiments be a permanent magnet.

The drive module 18 is powered by the motor 68, which in the present example is an electric motor, operatively connected through the gears 70 to the drive wheel 44. In the illustrated example, an encoder 72 is operatively connected with the motor 68. The motor 68 and gears 70 are housed within the motor housing portion 74 and motor cover 76 of the frame 52.

Figure 7:
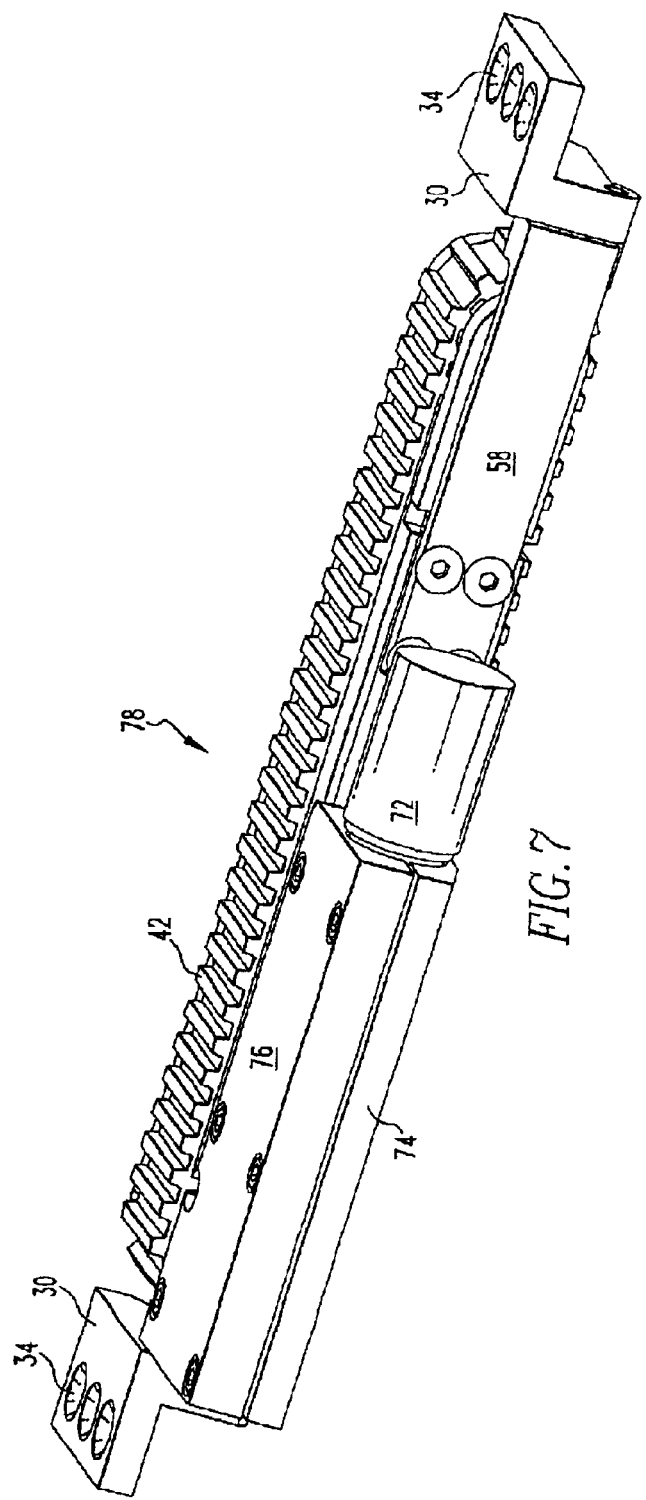
FIG. 7 is a side isometric view of an alternative drive module for a remote controlled inspection vehicle.

As can be seen from the above description, each drive module 18 is an independent, removable, interchangeable unit. Each drive module 18 may be positioned at any drive module location within the vehicle 10, 12. Additionally, the drive module 18 may be installed with either the track 42 or motor 68 adjacent to the longitudinal beam 16. Alternatively, the drive modules 18 may, if desired be replaced by a drive module having a different size track 42, for example, the drive module 78 in FIG. 7, having a larger track 42.

The vehicle 10, 12 will typically be used with an effector, typically an end effector, for performing various inspection within an environment inaccessible to humans, for example, between the rotor and stator of a generator. It has been found that a vehicle of the present invention may be utilized where passage through openings as little as approximately 0.75 inch tall is necessary.

Figure 8:
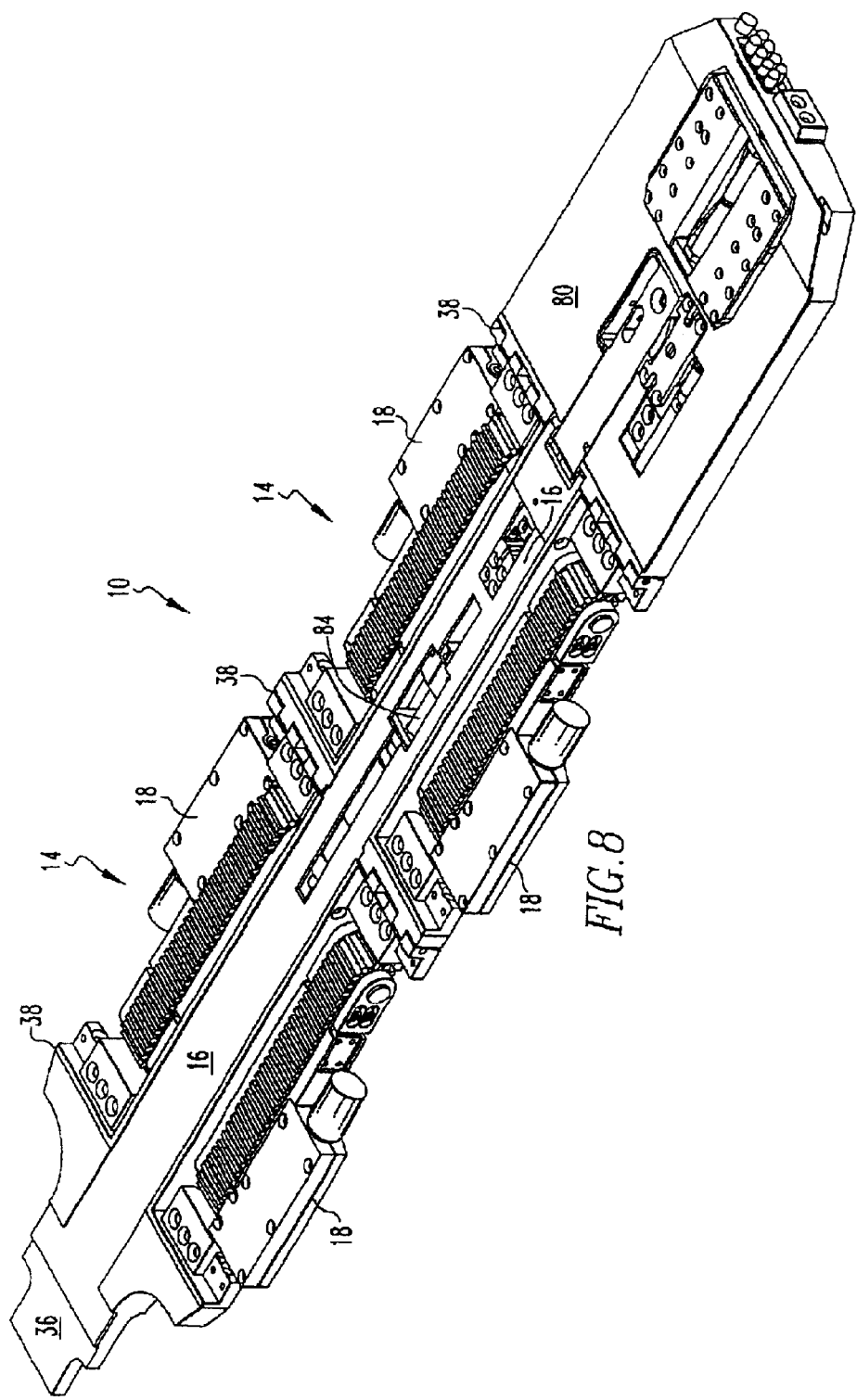
FIG. 8 is a top isometric view of a remote controlled inspection vehicle, illustrating a pair of frame modules, an end effector, and a tail module.
Figure 9:
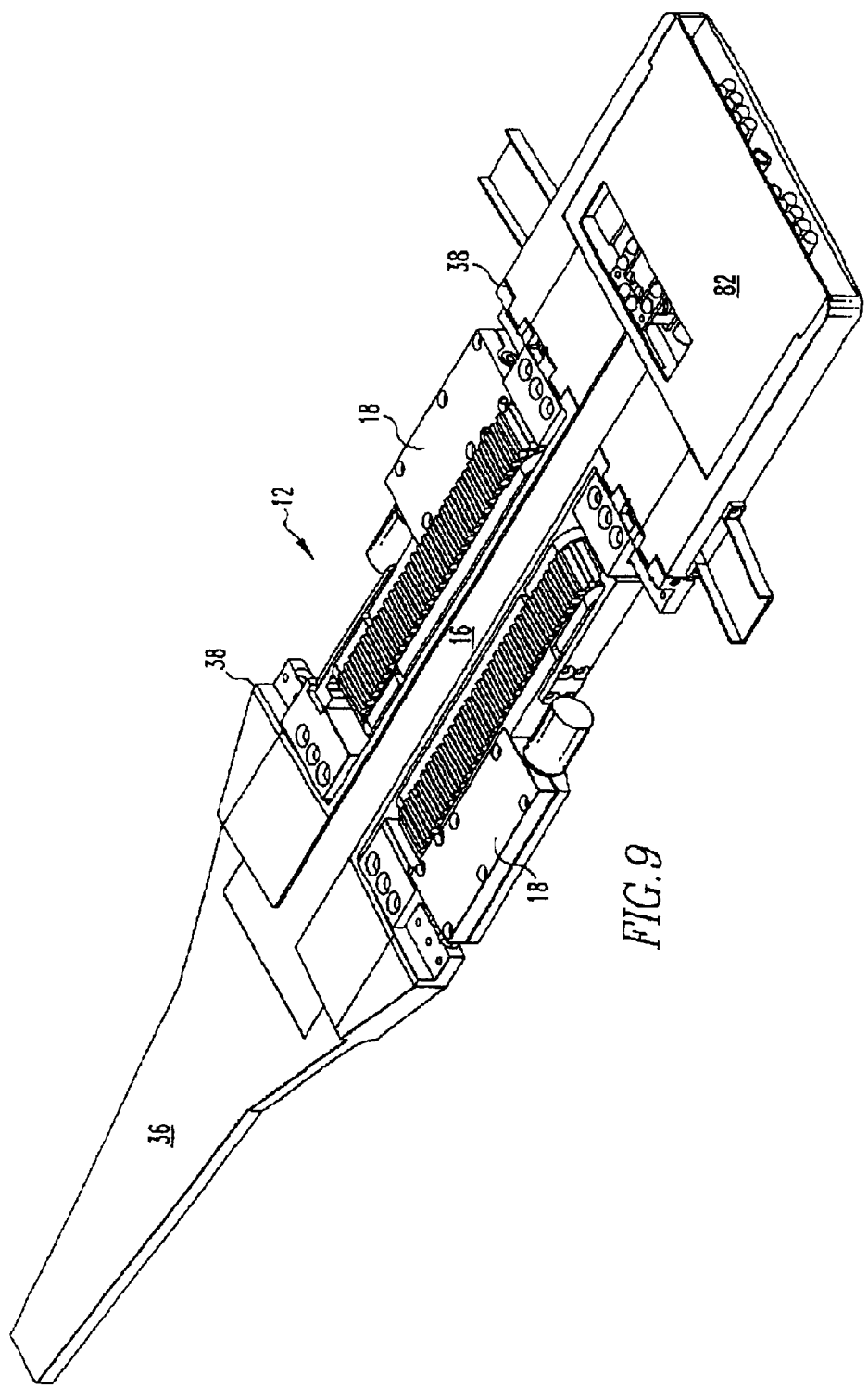
FIG. 9 is a top isometric view of an alternative remote controlled inspection vehicle, illustrating a single frame, and an alternative end effector, and a tail module.

A pair of example end effectors for performing various inspections in conjunction with the vehicles 10, 12 are illustrated in FIGS. 8 and 9. Referring to FIG. 8, an end effector 80 for checking the tightness of the coils within a generator, is illustrated. These coils are held in place in the iron using slot wedges having springs, such as ripple springs, under the wedges. The end effector 80 includes a hammer unit for striking the wedge, and a capacitive measurement probe for sensing the movements of the wedge. The use of the hammer striking unit makes the vehicle 10, having four drive modules 18, desirable. The vehicle 10, with the end effector 80, can therefore be used to inspect the interior of a generator to determine the probability of excessive vibration within that generator.

FIG. 9 illustrates a vehicle 12, having an end effector 82, for detecting electrical shorts between the various layers of laminated iron within the generator. The end effector 82 includes a loop cable and voltage source for inducing a magnetic field, a reference coil, and a sense coil mounted on the bottom of the end effector 82. The end effector 82 senses the differences in magnetic fields between the reference coil and the sense coil, with a change in this difference indicating a short between the generator laminations.

Figure 10:
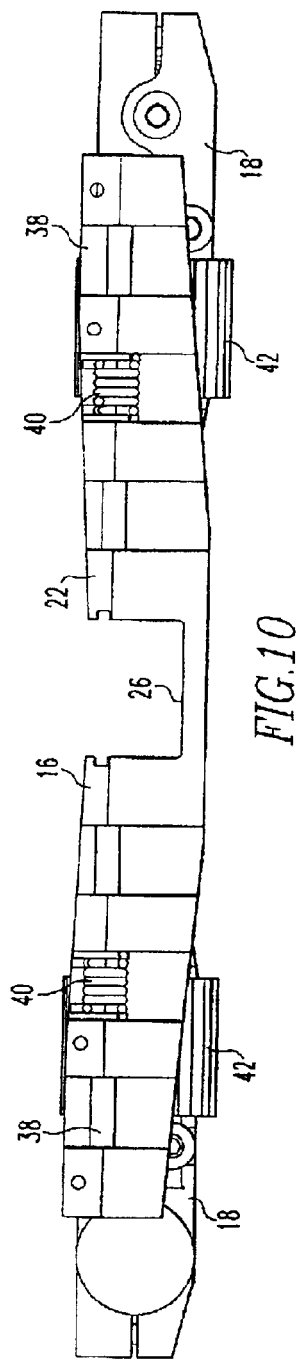
FIG. 10 is a front view of a complete frame unit for a remote controlled inspection vehicle, showing the drive modules in their horizontal orientation.
Figure 11:
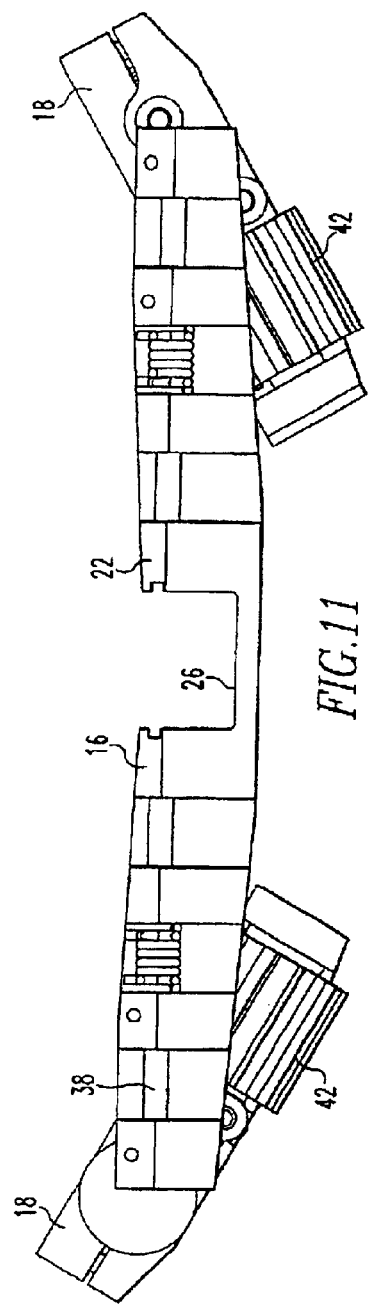
FIG. 11 is a front view of a complete frame module for a remote controlled inspection vehicle, illustrating the drive modules partially rotated to face the tracks partially outward.

To use the vehicle 10, 12, the appropriate number of frames 16 are hingedly joined together using the hinged detachments 38. Typically one or two frames 16 will be used. The appropriate number and configuration of the drive modules 18 are then affixed to the frames 16. A tail section 38 is hingedly secured to the rear transverse beam 24 of the rearmost frame 16. An end effector, for example, the end effectors 80, 82, are hingedly secured to the front transverse beam of the foremost frame 16. The modular construction of the vehicle permits the various components to be connected together in a wide variety of vehicle configurations, and many components may be located at more than one location on the vehicle. For example, a drive module 18 may be located anywhere within a frame 16 wherein a drive module is appropriate, and an individual drive module 18 is not constrained to use with either the right or left side of the vehicle. Electrical power, control, and signal wires 84 are extended from the remote control unit (not shown), through the tail 36, through the channel 26 in the frame's longitudinal beam 20, and to the end effector 80, 82, and motors 68 of the drive modules 18, as best illustrated in FIG. 8. The vehicle 10, 12 is then inserted into the location wherein an inspection is desired, for example, a generator. The hinged attachments 38 will pivot to an extent necessary to keep the tracks 42 in contact with the surface upon which the vehicle 10, 12 travels. In some embodiments, the hinged attachments 38 may permit pivoting of up to approximately 10°. Additionally, referring to FIGS. 10–13, the drive modules 18 will also pivot around an axis defined by the pins 60 and holes 62, providing additional assistance in keeping the tracks 42 in contact with the surface upon which the vehicle is traveling. FIG. 10 illustrates the orientation of the drive modules when the vehicle is traversing a horizontal surface. FIG. 13 illustrates the maximum rotation (approximately 135° in the illustrated example) of the drive modules 18 in one direction (with an equal maximum rotation permissible in the opposite direction), and FIGS. 11 and 12 illustrate other positions in between those of FIG. 10 and FIG. 13. The magnets contained within the magnet retaining regions 64 will cause the vehicle 10, 12 to magnetically adhere to a ferromagnetic surface, permitting the vehicle 10, 12 to traverse non-horizontal surfaces, such as pipes, walls, machinery components, etc. Power will be supplied to the drive wheel 44 of the continuous track 42 by the motor 68, propelling the vehicle 10, 12 forward. The power directed to each drive module 18 may be varied to rotate one continuous track 42 faster than another continuous track 42, thereby permitting the vehicle to turn. If desired, the tracks 42 on one side of the vehicle 10, 12 may be rotated one direction and the tracks 42 on the other side of the vehicle 10, 12 may be rotated in the opposite direction, thereby permitting the vehicle to rotate about a stationary point to change its direction of travel. The encoder 72 will transmit a signal associated with each turn of the motor 68 to the operator, thereby providing an indication of the location of the vehicle 10, 12.

Although the modular construction of the vehicle 10, 12 permits multiple configurations, it is generally preferred to use a vehicle 12 having a single frame 16 when maximum mobility through minimum spaces is required, and to use a vehicle 10 having two frames 16 and four drive modules 18 when maximum adhesion to the surface upon which the vehicle is traveling is required.

Figure 14:
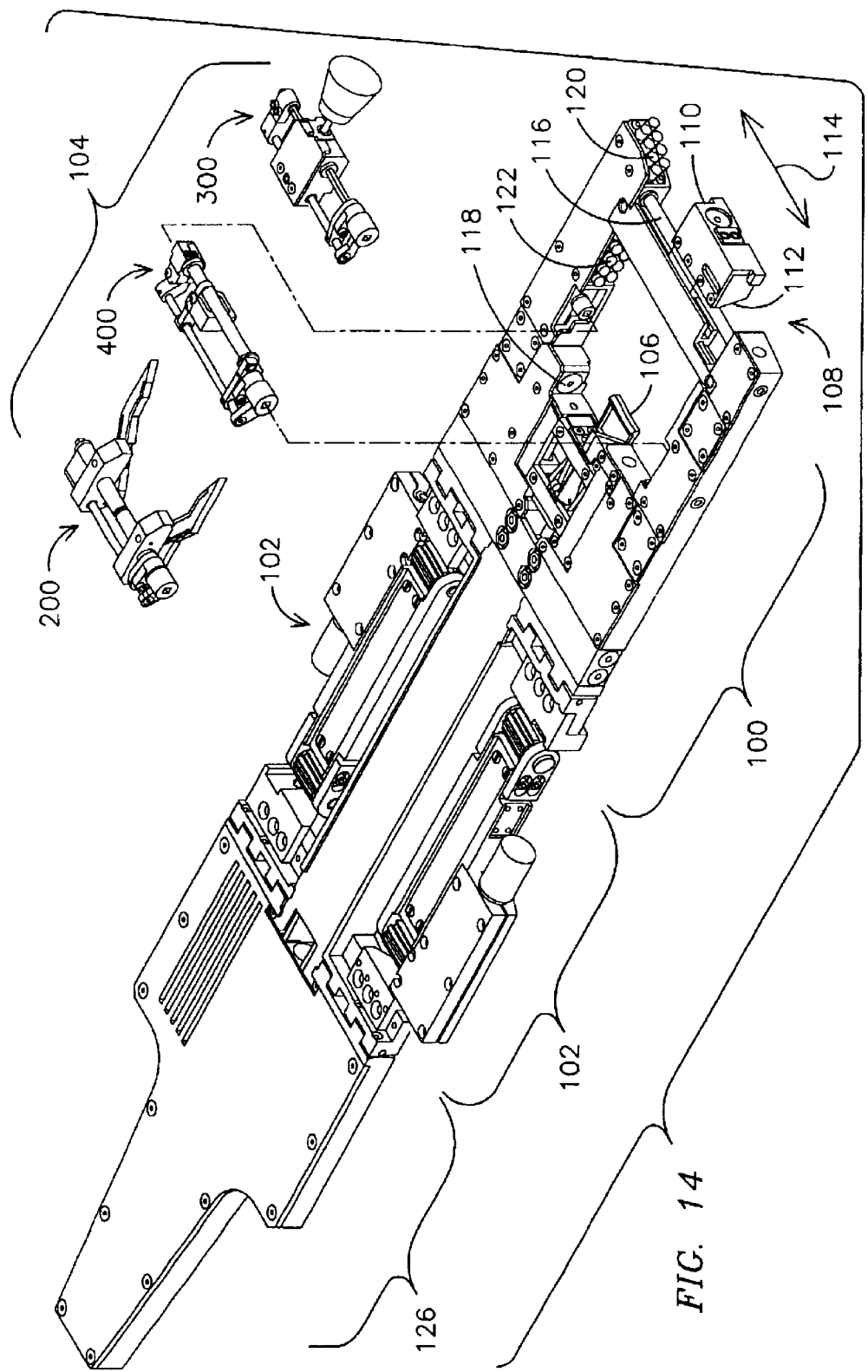
FIG. 14 shows an exemplary platform for supporting an interchangeable accessory in accordance with aspects of the present invention.

FIG. 14 shows an exemplary platform 100 in accordance with aspects of the present invention. As shown in FIG. 14, platform 100 may be attached to a propulsion frame 102 for receiving a respective interchangeable accessory selected from a set 104 of distinct interchangeable accessories, such as a gripper 200, a rotating brush assembly 300 and a vacuum hose positioner 400. The platform may further include a containment pan 106 (e.g., a dustpan) that may be remotely positioned up and down into any gap (e.g., slot) undergoing inspection. Although FIG. 14 shows platform 100 as separate from propulsion frame 102, it will be understood that platform 100 may be integrally constructed with the propulsion frame. That is, the propulsion frame may comprise the platform.

Any of the distinct operational tasks performed by such accessories may be monitored using one or more video cameras. For example, at the front end of the platform 100 there may be a camera assembly 108 including a video camera 110 facing forward, such as may be used for enabling the operator to guide the remote vehicle. The camera assembly may further include a video camera 112 facing rearwardly to monitor the tasks performed by the interchangeable accessories. In one exemplary embodiment camera 112 may be positioned to exhibit a tilt angle, for example, 45 degrees relative to a horizontal plane. As represented by a double-headed arrow 114, the camera assembly 108 may be laterally positioned along a shaft 116 in accordance with the needs of any given application. In addition, a stationary video camera 118 may be provided within platform 100 to monitor FOD (Foreign Object Debris) that may have been collected on the containment pan 106.

It will be now appreciated that the ability of being able to perform distinct operational tasks in locations generally inaccessible to humans, such as identifying, capturing, containing and retrieving FOD inside small spaces like the air gap between the stator and the rotor in a generator, while visually monitoring the performance of such tasks provides welcomed operational flexibility to users. For example, the operator will be able to determine the type of FOD in that air gap. Thus, if it is harmless debris, such as a small paint chip or dirt, the operator may decide to leave that debris undisturbed. Conversely, if the operator determines the existence of potentially harmful debris, such as a sliver of metal, then the operator will ensure that such potentially harmful debris is removed.

The platform 100 may include one or more arrays of light emitting diodes (LEDs). For example, an array of LEDs 120 may be positioned to illuminate forwardly of the platform. As better appreciated in FIG. 16, a pair of arrays of LEDs 122 may be positioned to illuminate the dustpan area as well as the effector tools of the interchangeable accessories. In general, the platform may include an array of sensors, such as ultrasonic, infrared, X-ray, that may allow (in lieu of or in combination with the video camera/s) the remote operator to guide the inspection vehicle and/or perform any given task in the location undergoing inspection.

Figure 15:
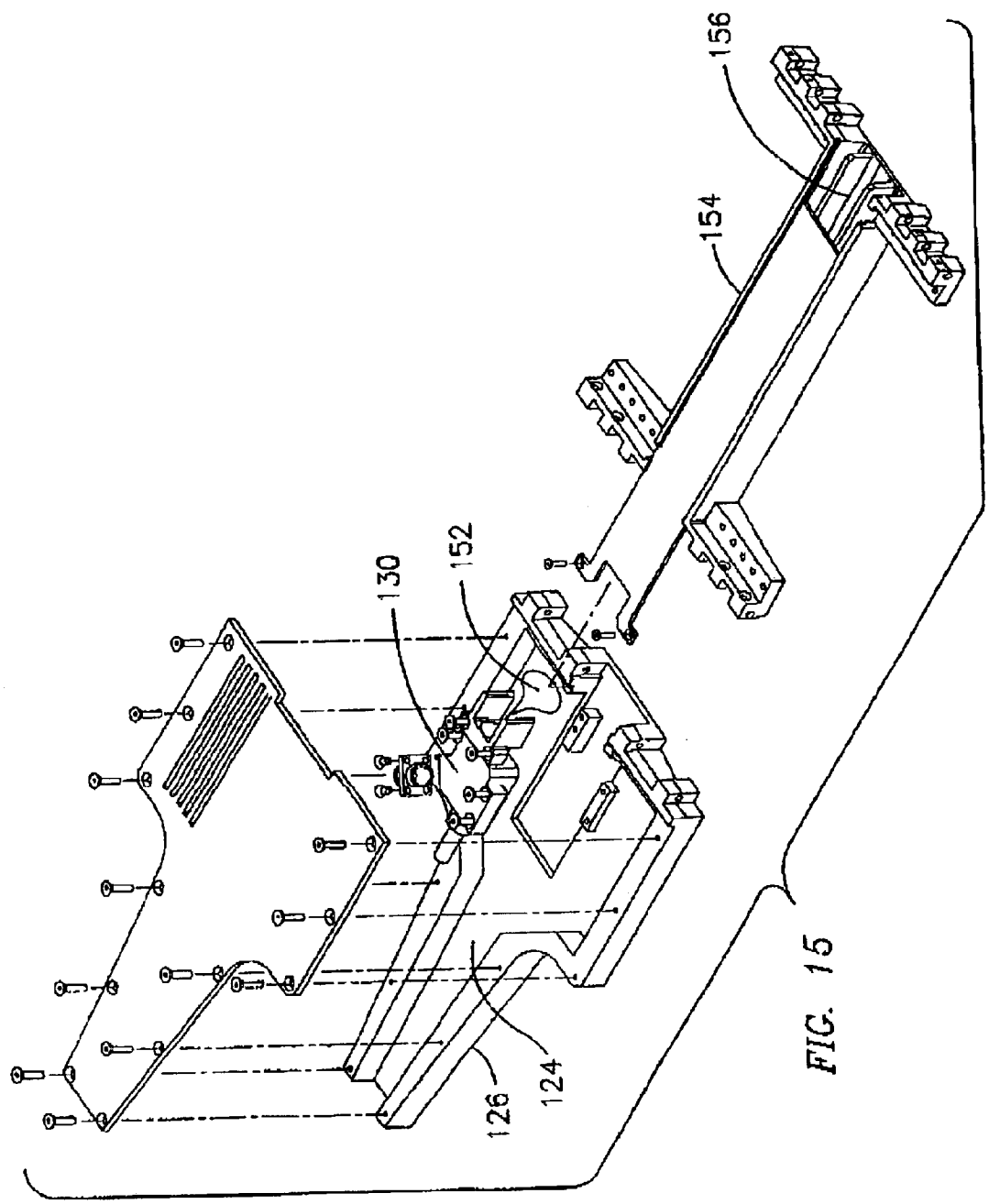
FIG. 15 shows a partially exploded view of a compartment that houses a miniaturized vacuum cleaner.

FIG. 15 shows a partially exploded view of a compartment 124, such as may be provided in a tail 126 connected to the propulsion frame 102 (FIG. 14). As shown in FIG. 15, compartment 124 houses a miniaturized vacuum cleaner 130. The vacuum cleaner receives pressurized inlet air to create a Venturi-effect vacuum. The use of pressurized air is particularly advantageous since in this case one need not maintain a vacuum over a potentially long connection to the outside of a machine undergoing inspection, such as a generator. In one exemplary embodiment, one can advantageously feed compressed air in a relatively narrow and flexible tube to the vacuum cleaner and create a relatively strong Venturi-based vacuum inside the compartment that houses the vacuum cleaner, in lieu of creating and maintaining a vacuum all the way through the potentially lengthy tubing back to the vacuum-producing equipment that would be located outside of the generator. Compartment 124 may further house a bag 152 or confined volume for accumulating FOD collected in response to suction created by the vacuum cleaner in a vacuum hose (not shown) connected to the vacuum cleaner. A support assembly 154, part of propulsion frame 102 (FIG. 14), may include a conduit 156 for carrying the vacuum hose to platform 100 (FIG. 14).

Figure 16:
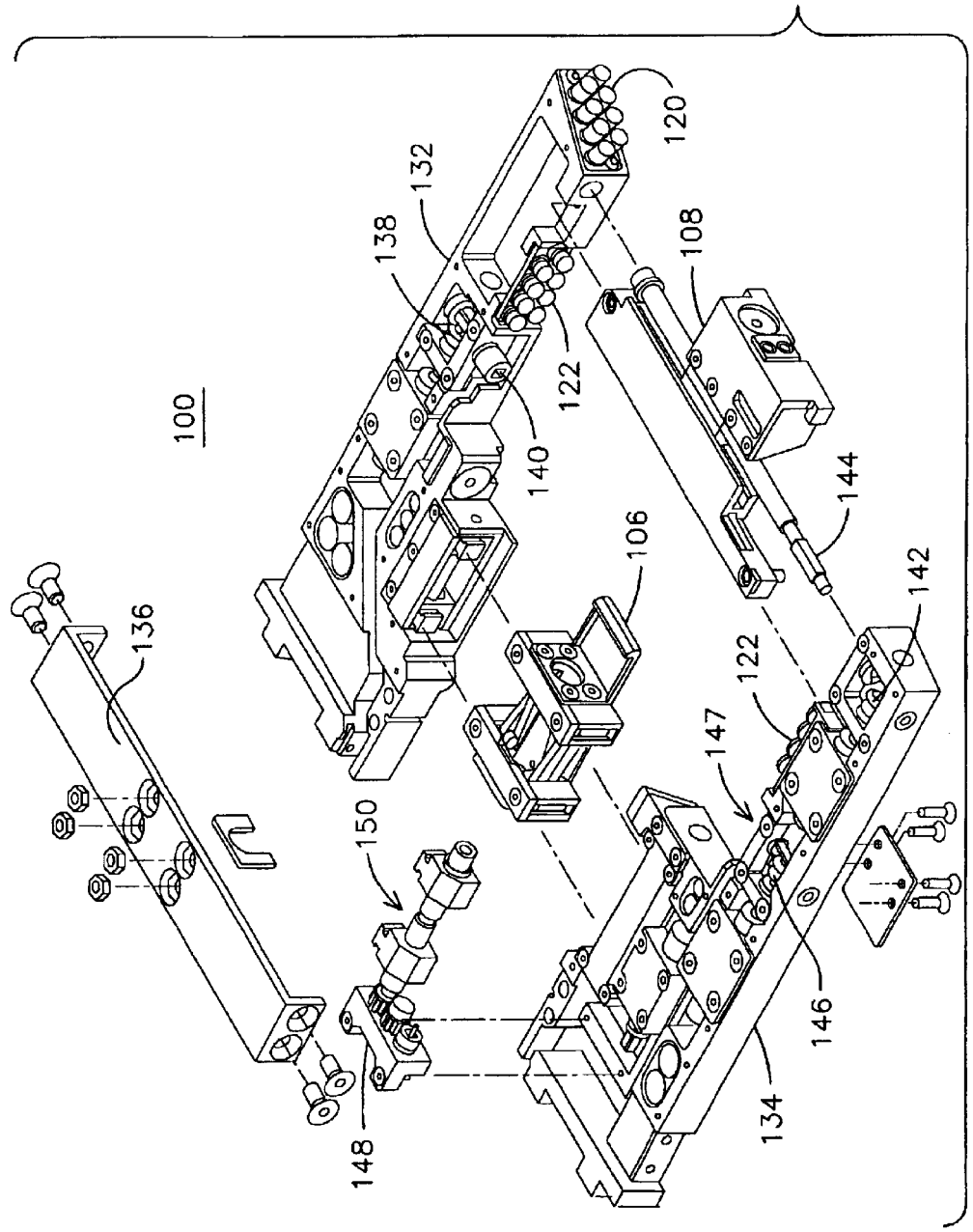
FIG. 16 is a partially exploded view of an exemplary embodiment of a platform comprising first and second lateral subassemblies connected to a support bracket.
Figure 17:
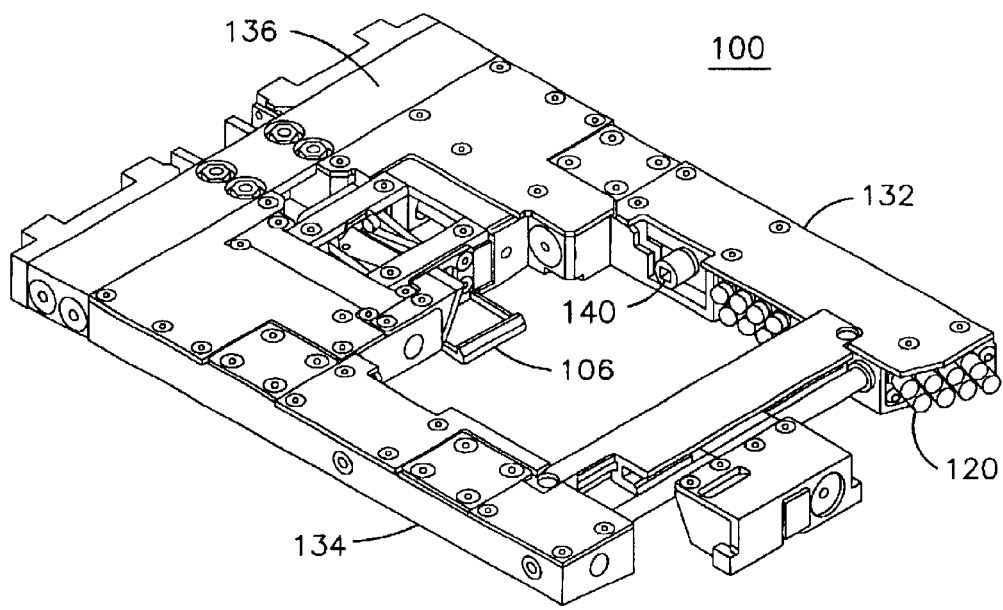
FIG. 17 is an assembled view of the platform shown in FIG. 16.

As shown in FIG. 16, the platform 100 in one exemplary embodiment comprises first and second lateral subassemblies 132 and 134 connected to a support subassembly 136, e.g., a bracket. The first subassembly 132 may include a motor 138 coupled through appropriate gears to a mechanical power takeoff 140. Subassembly 132 may further include magnets arranged to provide support relative to the generator. The second lateral subassembly 134 in one exemplary embodiment may house three motors. A first motor 142 may be coupled to miter gears, which are in turn coupled to an acme thread 144 to drive (e.g., right or left) the video camera assembly 108. A second motor 146 may be coupled to drive through appropriate gears another mechanical power takeoff 147. A third motor 148 may be coupled to a spur gear subassembly 150 for driving the containment pan 106 up and down, such as into the slot of the generator. FIG. 17 shows an assembled view of the partially exploded view of platform 100 seen in FIG. 16.

As will be appreciated by those skilled in the art, one of the advantages provided by a platform in accordance with aspects of the present invention is the ability to provide at least one mechanical power takeoff (e.g., mechanical power takeoffs 140 and 147 (FIG. 16) that may be universally used to interface with a corresponding mechanical power receptor (e.g., mechanical power receptors 202 and 204 (FIG. 18)) for coupling mechanical energy to any of the interchangeable accessories independently of the specific accessory being used for performing any given task. The power takeoffs and receptors may be implemented in different forms, such as a belt/pulley, a rotating shaft, a reciprocating member, a push rod, compressed fluid (e.g., air or hydraulic fluid), core/hub, or any combination thereof.

It will be further appreciated by those skilled in the art that the foregoing described accessories just represent examples of many types of interchangeable accessories that may be received by the platform. Accordingly, the present invention should not be limited to those specific examples. For instance, if one needed to repaint the interior of the generator, it may be desirable to provide an interchangeable accessory with the appropriate tools for performing a painting task. In another application, one may desire to perform a cleansing task with a tool other than a rotating brush, and in this case one may provide an accessory specifically suited for the desired cleansing application. One key advantage, however, remains in one being able to universally use the mechanical power takeoff/s made available in the platform regardless of the specific type of interchangeable accessory assembly being used.

Figure 18:
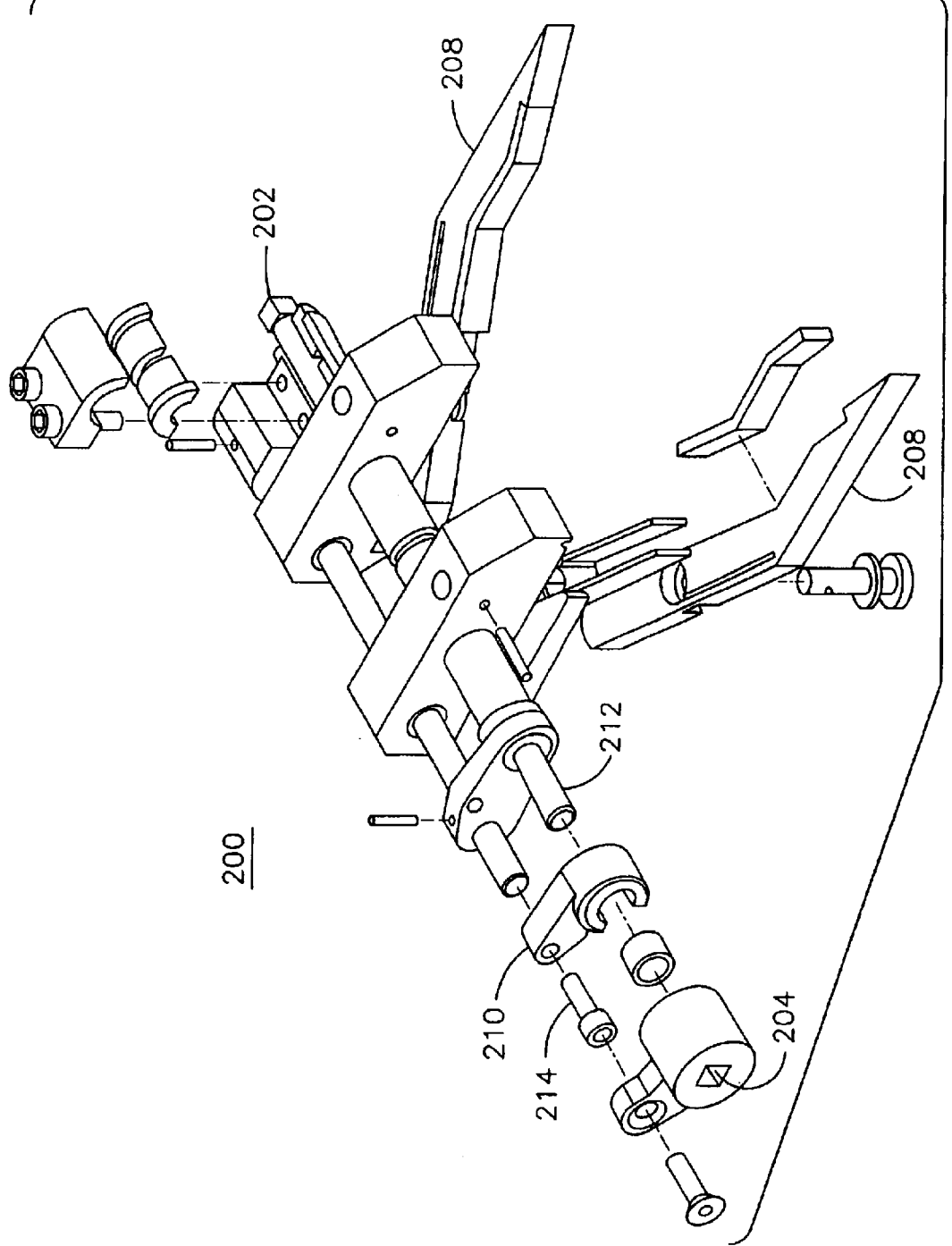
FIG. 18 is a partially exploded view of an exemplary interchangeable accessory comprising a gripper.

FIG. 18 illustrates a partially exploded view of an exemplary interchangeable accessory comprising a gripper 200. The gripper includes a mechanical power receptor 202 (e.g., a male plug) connectable to the mechanical power takeoff 140 (FIG. 16) on the first lateral subassembly of platform 100. The gripper further includes another mechanical power receptor 204 (e.g., a female slot) connectable to the mechanical power takeoff 147 (FIG. 16) on the second lateral subassembly of the platform. In one exemplary embodiment, the mechanical power receptor 204 is connected to a motorized gear (such as may be part of second subassembly 134 (FIG. 16)) that allows tilting the gripper, as represented by arrow 206 in FIG. 19. In this exemplary embodiment, the mechanical power receptor 202 may be connected to another motorized gear that allows driving a pair of gripper arms 208 either to open or to close (as represented by arrow 209 in FIG. 19) so as to be able to grip FOD present in the location undergoing inspection.

Figure 19:
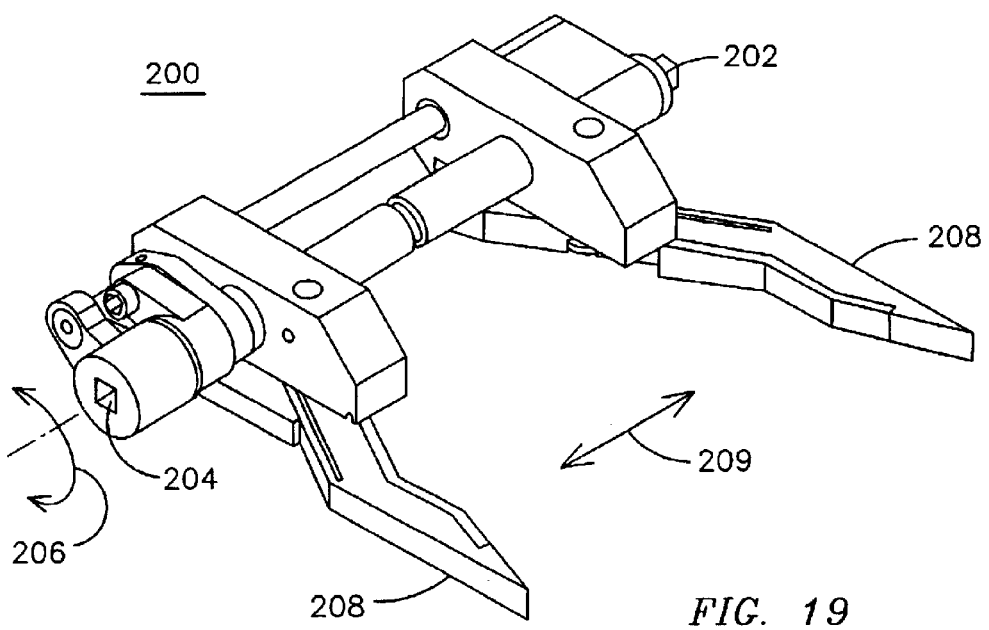
FIG. 19 is an assembled view of the gripper shown in FIG. 18.

One advantageous feature of the interchangeable accessories is the ability to provide a quick disconnect relative to platform 100. In one exemplary embodiment, a clamp 210, such as may be made of Teflon, is demountably connected to a shaft 212 and is pivotable relative to a pivot screw 214. When one desires to decouple the interchangeable accessory, one would rotate or flip the clamp 210 relative to the pivot screw 214 so that clamp 210 is no longer connected to the shaft 212. Once the clamp has been disconnected from the shaft one can slide mechanical power receptor 204 towards the center of the gripper, e.g., away from the corresponding mechanical power takeoff 147. Once mechanical power receptor 204 has been disconnected from the corresponding mechanical power takeoff, one may tilt the interchangeable accessory so as to disconnect mechanical power receptor 202 from the corresponding mechanical power takeoff on the first side subassembly. The foregoing quick disconnect structure may be made available in each of the interchangeable accessories regardless of the specific task performed by any given accessory. FIG. 19 shows an assembled view of the partially exploded view of gripper 200 seen in FIG. 18.

Figure 21:
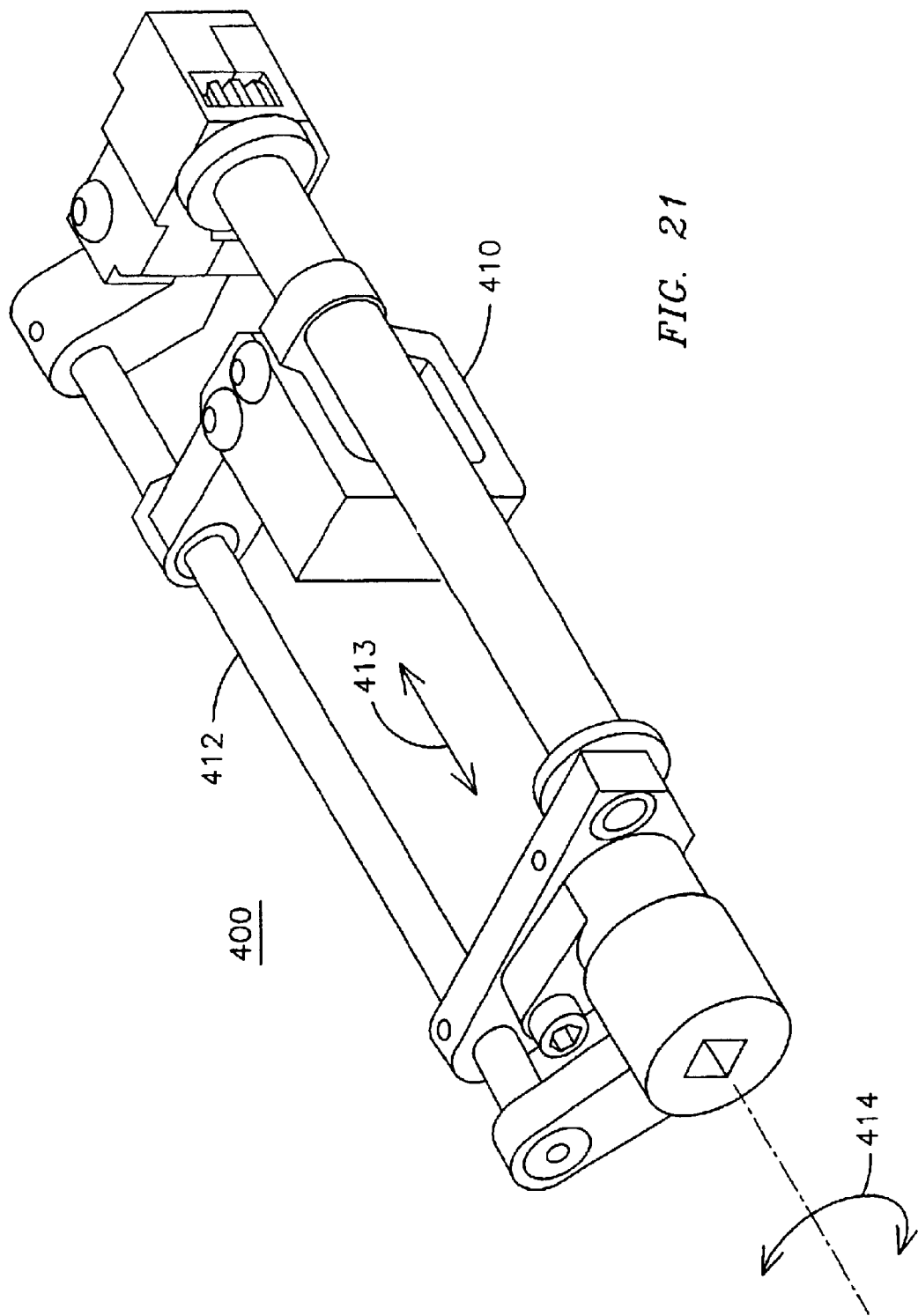
FIG. 21 is an assembled view of the vacuum hose positioner shown in FIG. 20.

FIG. 20 illustrates details regarding a vacuum hose positioner 400. The vacuum hose positioner can selectively move the tip of a flexible vacuum hose, such as may be connected to a vacuum hose clamp 410 along a lead shaft 412, as represented by double-headed arrow 413. In one exemplary embodiment, the vacuum hose positioner also has the capability of tilting the tip of the vacuum hose by up to approximately 90 degrees as represented by arc 414. The lateral and tilting movements may be provided using the same mechanical power takeoffs and receptors, as described for the gripper accessory. This assembly may be installed using the same universal quick disconnect structures as discussed for the gripper and such details will not be repeated. FIG. 21 shows an assembled view of the partially exploded view of vacuum hose positioner 400, as seen in FIG. 20.

Figure 22:
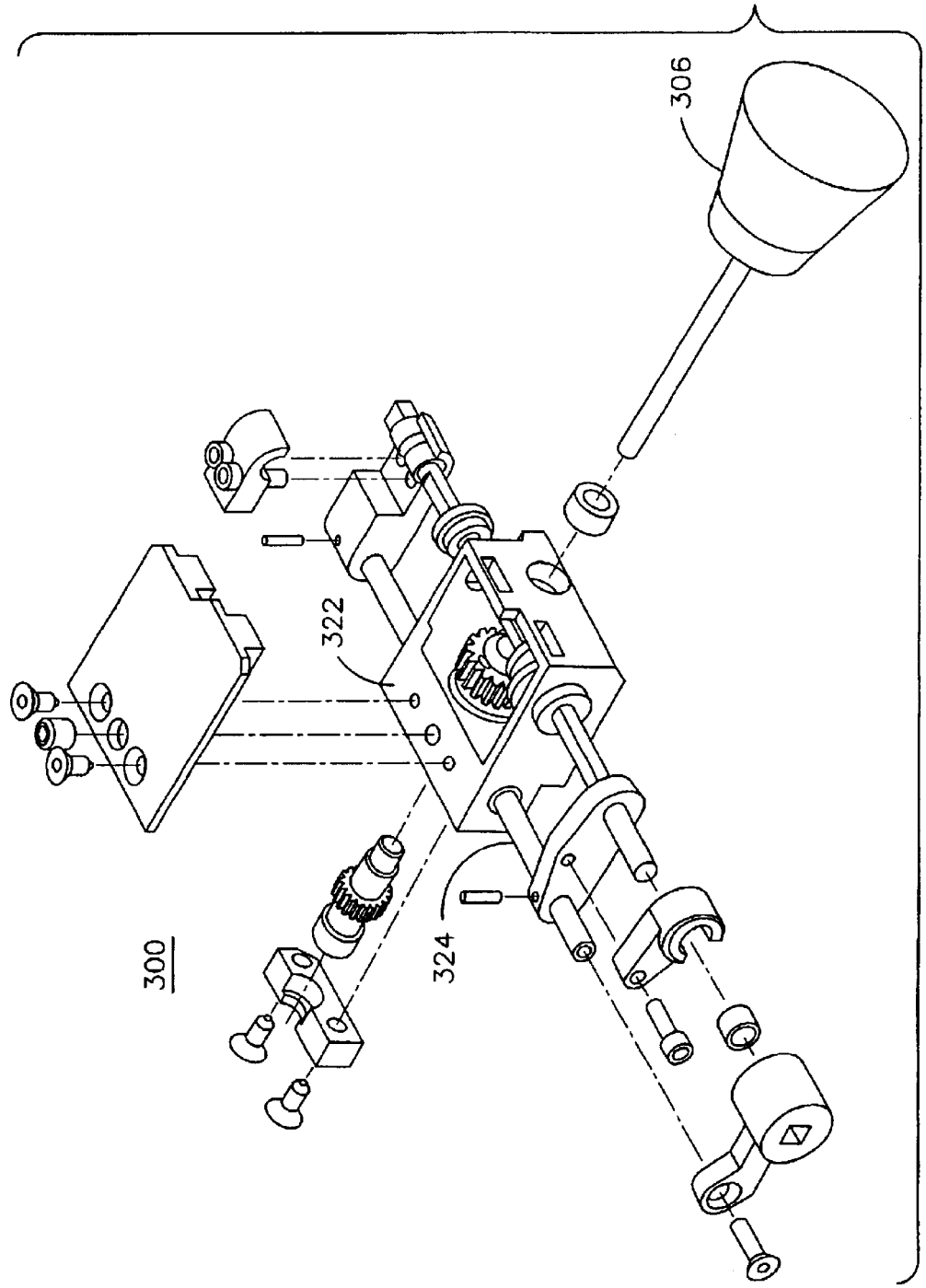
FIG. 22 is a partially exploded view of an exemplary interchangeable accessory comprising a rotating brush assembly.
Figure 23:
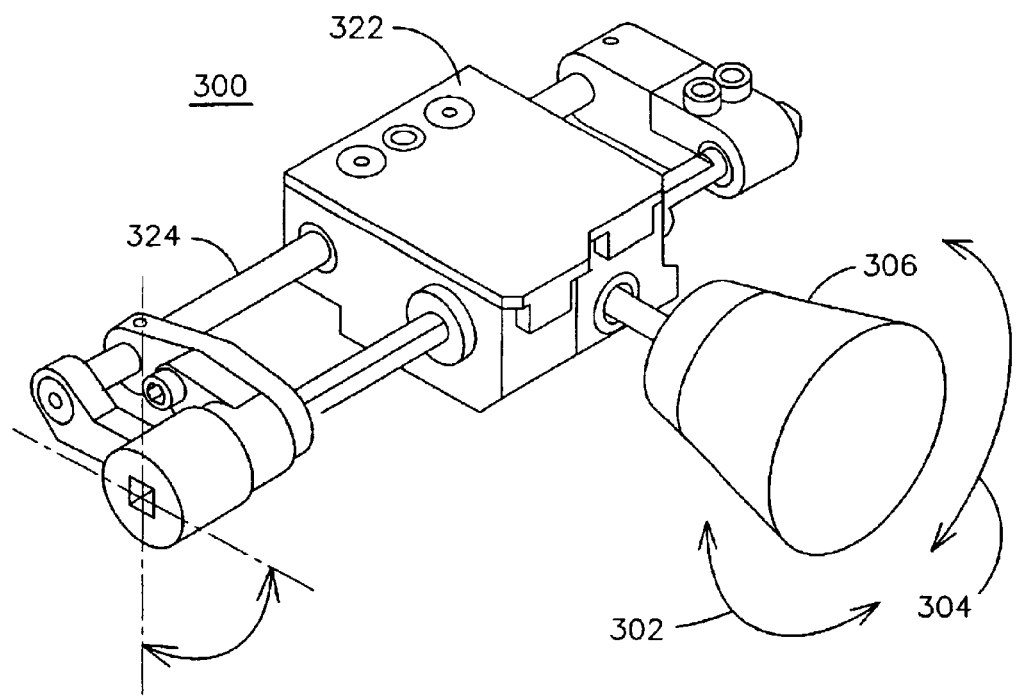
FIG. 23 is an assembled view of the brush assembly shown in FIG. 22.
Figure 24:
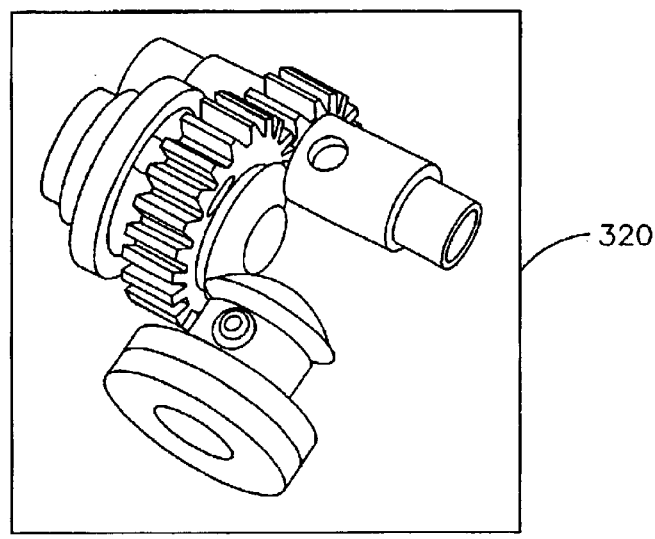
FIG. 24 shows an exemplary embodiment of a sweep gear assembly that may be used by the rotating brush assembly.

FIG. 22 illustrates a partially exploded view of an exemplary brush assembly 300. As represented in FIG. 23 by arc segments 302 and 304, a brush 306 can selectively rotate either clockwise or counter-clockwise in response to mechanical power supplied through a sweep gear assembly 320 (FIG. 24) connected to mechanical power takeoff 140 (FIG. 16). The brush assembly can be tilted in response to mechanical power supplied from mechanical power takeoff 147 (FIG. 16) through sweep gear assembly 320. In one embodiment, the angular tilt may be up to about 90 degrees for insertion into low clearance areas. In addition, a box 322 that houses the gear assembly 320 may be axially slideable along a lead shaft 324 into any desired position and locked into that position before the platform is utilized to perform any desired task at the location to be inspected. For example, in some situations, one may want to position the cup brush at a location just along the edge of the slot instead of the center of the slot.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

We claim:

1. A remote-controlled vehicle for performing a plurality of tasks, the vehicle comprising:
    a propulsion frame responsive to control signals generated remotely from the vehicle, the frame configured to support an interchangeable accessory selected from a set of distinct interchangeable accessories, each distinct interchangeable accessory configured to perform a distinct operational task, the frame comprising at least one mechanical power takeoff, each accessory comprising at least one mechanical power receptor configured to interface with the at least one mechanical power takeoff for coupling mechanical energy to the accessory, the frame constituting a universal mounting frame for the set of distinct interchangeable accessories, wherein the frame comprises first and second lateral subassemblies spaced apart from one another, and a back subassembly for supporting the first and second lateral subassemblies.

2. The remote-controlled vehicle of claim 1 wherein the distinct interchangeable accessories are selected from the group consisting of a gripper, a rotating brush assembly, and a vacuum hose positioner.

3. The remote-controlled vehicle of claim 1 wherein the platform for supporting each of the distinct interchangeable accessory comprises a universal quick-disconnect assembly for enabling a user to manually mount and dismount each interchangeable accessory from the platform.

4. The remote-controlled vehicle of claim 1 further comprising at least one sensor positionable to monitor any of the interchangeable accessories while performing the distinct operational tasks.

5. The remote-controlled vehicle of claim 1 wherein the interchangeable accessory comprises a gripper, wherein said gripper comprises at least one pair of arms for grabbing an object, the arms connected to a gear assembly having a first gear responsive to mechanical power received through the mechanical power receptor.

6. A remote-controlled vehicle for performing a plurality of tasks, the vehicle comprising:
    a propulsion frame responsive to control signals generated remotely from the vehicle, the frame configured to support an interchangeable accessory selected from a set of distinct interchangeable accessories, each distinct interchangeable accessory configured to perform a distinct operational task, the frame comprising at least one mechanical power takeoff, each accessory comprising at least one mechanical power receptor configured to interface with the at least one mechanical power takeoff for coupling mechanical energy to the accessory, the frame constituting a universal mounting frame for the set of distinct interchangeable accessories; and
    a containment pan, wherein the containment pan is responsive to a motorized gear to be selectably movable upwardly and downwardly in a gap through which the vehicle may travel.

7. A remote-controlled vehicle for performing a plurality of tasks, the vehicle comprising:
    a propulsion frame responsive to control signals generated remotely from the vehicle, the frame configured to support an interchangeable accessory selected from a set of distinct interchangeable accessories, each distinct interchangeable accessory configured to perform a distinct operational task, the frame comprising at least one mechanical power takeoff, each accessory comprising at least one mechanical power receptor configured to interface with the at least one mechanical power takeoff for coupling mechanical energy to the accessory, the frame constituting a universal mounting frame for the set of distinct interchangeable accessories; and
    a vacuum cleaner responsive to a pressurized air source to create a Venturi-induced vacuum, wherein the vacuum cleaner further comprises a confined volume for accumulating debris collected in response to suction created by the vacuum cleaner in a vacuum hose connected thereto.

8. The remote-controlled vehicle of claim 7 wherein a tip of the vacuum hose is connected to an interchangeable accessory comprising a vacuum hose positioner, wherein the at least one mechanical power receptor of the vacuum hose positioner is connected to a gear assembly having a first gear configured to provide lateral movement to the tip of the vacuum hose.

9. The remote-controlled vehicle of claim 8 wherein the vacuum hose positioner further comprises another mechanical power receptor connected to a second gear configured to provide tilting movement to the tip of the vacuum hose.

10. A remote-controlled vehicle for performing a plurality of tasks, the vehicle comprising:
    a propulsion frame responsive to control signals generated remotely from the vehicle, the frame configured to support an interchangeable accessory selected from a set of distinct interchangeable accessories, each distinct interchangeable accessory configured to perform a distinct a operation task, the frame comprising at least one mechanical power takeoff, each accessory comprising at least one mechanical power receptor configured to interface with the at least one mechanical power takeoff for coupling mechanical energy to the accessory the frame constituting universal mounting frame for the set of distinct interchangeable accessories, wherein said vehicle is dimensioned and configured to travel through gaps as small as approximately 0.75 inch in height.

11. The remote-controlled vehicle of claim 10, wherein the interchangeable accessory comprises a gripper, wherein said gripper comprises at least one pair of arms for grabbing an object, the arms connected to a gear assembly having a first gear responsive to mechanical power received through the mechanical power receptor.

12. The remote-controlled vehicle of claim 11 wherein the gripper further comprises another mechanical power receptor connected to a second gear configured to provide tilting movement to said arms.

13. The remote-controlled vehicle of claim 10 wherein the distinct interchangeable accessories are selected from the group consisting of a gripper, a rotating brush assembly, and a vacuum hose positioner.

14. The remote-controlled vehicle of claim 10 wherein the platform for supporting each of the distinct interchangeable accessory comprises a universal quick-disconnect assembly for enabling a user to manually mount and dismount each interchangeable accessory from the platform.

15. The remote-controlled vehicle of claim 10 further comprising at least one sensor positionable to monitor any of the interchangeable accessories while performing the distinct operational tasks.

16. A remote-controlled vehicle for performing a plurality of tasks, the vehicle comprising:
a propulsion frame responsive to control signals generated remotely from the vehicle, the frame configured to support an interchangeable accessory selected from a set of distinct interchangeable accessories, each distinct interchangeable accessory configured to perform a distinct operational task, the frame comprising at least one mechanical power takeoff, each accessory comprising at least one mechanical power receptor configured to interface with the at least one mechanical power takeoff for coupling mechanical energy to the accessory, the frame constituting a universal mounting frame for the set of distinct interchangeable accessories, wherein the interchangeable accessory comprises a brush assembly having at least one brush connected to a gear assembly having a first gear for rotating in a desired angular direction in response to mechanical power received through the mechanical power receptor.

17. The remote-controlled vehicle of claim 16 wherein the brush assembly further comprises another mechanical power receptor connected to a second gear to provide tilting movement to said brush.

18. A platform for performing a plurality of tasks, the platform comprising:
an interchangeable accessory selected from a set of distinct interchangeable accessories, each distinct interchangeable accessory configured to perform a distinct operational task, the platform comprising at least one mechanical power takeoff, each accessory comprising at least one mechanical power receptor configured to interface with the at least one mechanical power takeoff for coupling mechanical energy to the accessory, the platform constituting a universal platform for the set of distinct interchangeable accessories; and
a containment pan, wherein the containment pan is responsive to a motorized gear to be selectably movable upwardly and downwardly in a gap through which the platform may travel.

19. The platform of claim 18 wherein the platform for supporting each of the distinct interchangeable accessory comprises a universal quick-disconnect assembly for enabling a user to manually mount and dismount each interchangeable accessory from the platform.

20. The platform of claim 18 further comprising at least one sensor positionable to monitor any of the interchangeable accessories while performing the distinct operational tasks.

21. A platform for performing a plurality of tasks, the platform comprising:
an interchangeable accessory selected from a set of distinct interchangeable accessories, each distinct interchangeable accessory configured to perform a distinct operational task, the platform comprising at least one mechanical power takeoff, each accessory comprising at least one mechanical power receptor configured to interface with the at least one mechanical power takeoff for coupling mechanical energy to the accessory, the platform constituting a universal platform for the set of distinct interchangeable accessories; and
a compartment including a vacuum cleaner responsive to a pressurized air source to create a Venturi-induced vacuum, wherein the compartment further comprises confined volume for accumulating debris collected in response to suction created by the vacuum cleaner in a vacuum hose connected thereto.

22. A platform for performing a plurality of tasks, the platform comprising:
an interchangeable accessory selected from a set of distinct interchangeable accessories, each distinct interchangeable accessory configured to perform a distinct operational task, the platform comprising at least one mechanical power takeoff, each accessory comprising at least one mechanical power receptor configured to interface with the at least one mechanical power takeoff for coupling mechanical energy to the accessory, the platform constituting a universal platform for the set of distinct interchangeable accessories wherein a tip of the vacuum hose is connected to an interchangeable accessory comprising a vacuum hose positioner, wherein the at least one mechanical power receptor of the vacuum hose positioner is connected to a gear assembly having a first gear configured to provide lateral movement to the tip of the vacuum hose, wherein the vacuum hose positioner further comprises another mechanical power receptor connected to a second gear in the gear assembly configured to provide tilting movement to the tip of the vacuum hose.

23. A platform for performing a plurality of tasks, the platform comprising:
an interchangeable accessory selected from a set of distinct interchangeable accessories, each distinct interchangeable accessories configured to perform a distinct operational task, the platform comprising at least one mechanical power takeoff, each accessory comprising at least one mechanical power receptor configured to interface with the at least one mechanical power takeoff for coupling mechanical energy to the accessory, the platform constituting a universal platform for the set of distinct interchangeable accessories, wherein said platform is dimensioned and configured to pass through gaps as small as approximately 0.75 inch in height.

24. A platform for performing a plurality of tasks, the platform comprising:

an interchangeable accessory selected from a set of distinct interchangeable accessories, each distinct interchangeable accessory configured to perform a distinct operational task, the platform comprising at least one mechanical power takeoff, each accessory comprising at least one mechanical power receptor configured to interface with the at least one mechanical power takeoff for coupling mechanical energy to the accessory, the platform constituting a universal platform for the set of distinct interchangeable accessories, wherein the interchangeable accessory comprises a gripper, wherein the gripper comprises at least one pair of arms for grabbing an object, the arms connected to a gear assembly having a first gear responsive to mechanical power received through the mechanical power receptor, wherein the gripper further comprises another mechanical power receptor connected to a second gear in the gear assembly configured to provide tilting movement to said arms.

25. A platform for performing a plurality of tasks, the platform comprising:

an interchangeable accessory selected form a set of distinct interchangeable accessories, each distinct interchangeable accessory configured to perform a distinct operational task, the platform comprising at least one mechanical power takeoff each accessory comprising at least one mechanical power receptor configured to interlace with the at least one mechanical power takeoff for coupling mechanical energy to the accessory, the platform constituting a universal platform for the set of distinct interchangeable accessories, wherein the interchangeable accessory comprises a brush assembly having at least one brush connected to a gear assembly having a first gear for rotating in any desired angular direction in response to mechanical power received through the mechanical power receptor, wherein the brush assembly further comprises another mechanical power receptor connected to a second gear in the gear assembly to provide tilting movement to said brush.

26. A method for performing a plurality of tasks in a location generally inaccessible to humans, the method comprising:

generating control signals for remotely operating a propulsion frame at a location undergoing inspection;

selecting an interchangeable accessory from a set of distinct interchangeable accessories, each distinct accessory configured to perform a distinct operational task;

mounting onto the frame the selected accessory;

providing at least one mechanical power takeoff at the frame configured to interface with at least one mechanical power receptor at the selected accessory for coupling mechanical energy to the accessory; and providing at least one sensor configured to monitor any of the interchangeable accessories while performing the distinct operational tasks, wherein in response to a condition sensed by the sensor, selecting a different interchangeable accessory for performing a task appropriate to the sensed condition.

27. A remote-controlled vehicle, comprising;

at least one frame, wherein the frame is configured to support an interchangeable accessory selected from a set of distinct interchangeable accessories, each distinct interchangeable accessory configured to perform a distinct operational task, the frame comprising at least one mechanical power takeoff, each accessory comprising at least one mechanical power receptor configured to interface with the at least one mechanical power takeoff for coupling mechanical energy to the accessory the frame constituting a universal mounting frame for the set of distinct interchangeable accessories; and a pair of drive modules removably secured to said at least one frame, each of said drive modules having a continuous track, and a motor dimensioned and configured to transmit locomotive force from said motor to said continuous track, said drive module further defining a longitudinal axis, said continuous track being dimensioned and configured to pivot around an axis parallel to said longitudinal axis.

28. The method of claim 26 further comprising providing a quick-disconnect assembly for enabling a user to manually mount and dismount any interchangeable accessory from the frame.

* * * * *